US012710141B1

(12) United States Patent
Carlile et al.

(10) Patent No.: US 12,710,141 B1
(45) Date of Patent: Aug. 18, 2026

(54) METHOD FOR TESTING PIPELINES

(71) Applicant: Blue Sky Construction, LLC, Meridian, ID (US)

(72) Inventors: Jodie Carlile, Glens Ferry, ID (US); John Beals, Meridian, ID (US)

(73) Assignee: Blue Sky Construction, LLC, Meridian, ID (US)

( * ) Notice: Subject to any disclaimer, the term of this patent is extended or adjusted under 35 U.S.C. 154(b) by 402 days.

(21) Appl. No.: 18/468,292

(22) Filed: Sep. 15, 2023

(51) Int. Cl.
*G01M 3/04* (2006.01)
*F17D 5/02* (2006.01)
*G01M 3/28* (2006.01)
*G05D 16/20* (2006.01)

(52) U.S. Cl.
CPC ............. *F17D 5/02* (2013.01); *G01M 3/2815* (2013.01); *G05D 16/2066* (2013.01)

(58) Field of Classification Search
USPC .............................................................. 73/40
See application file for complete search history.

(56) References Cited

U.S. PATENT DOCUMENTS 6,957,567 B2 * 10/2005 Kolbe ...................... G01N 3/12 417/345
7,107,820 B2 * 9/2006 Nunnally .................. F17D 5/06 73/40
7,398,675 B1 * 7/2008 Metzger ................ F16L 55/105 73/40
8,061,184 B2 * 11/2011 Brown ................ G01M 3/2807 73/40
2012/0174654 A1 * 7/2012 Smida ..................... G01M 3/26 73/37
2013/0110417 A1 * 5/2013 Balogh ............... G01M 3/2846 702/50
2016/0138997 A1 * 5/2016 Zhu ...................... G08B 21/182 340/626

* cited by examiner

*Primary Examiner* — Walter L Lindsay, Jr.
*Assistant Examiner* — Warren K Fenwick
(74) *Attorney, Agent, or Firm* — Hawley Troxell; Philip McKay

(57) ABSTRACT

A method for pipeline testing uses an electronics control module to monitor remote sensor data and compare the remote sensor data to control parameter input data that includes data indicating acceptable testing parameter ranges. In response to the comparison of the real time sensor data and the control parameter input data, the electronics control module generates various control signals used to control an automated fluid control system to regulate the pressure in the pipeline being tested and, if necessary, instigate an emergency shutdown of the test and to release all pressure from the section of pipe being tested. All test data is recorded, stored, and made available as needed/desired.

22 Claims, 13 Drawing Sheets

103
301
302
Solenoid 24V DC Power Supply
303
Accessory 24V DC Power Supply
Fuses
304
Out to HMI Display
Out to Primary Pressure Sensor
Out to Secondary Pressure Sensor
121
120
310
Pressure Up Solenoid Relays
310
Primary Processor 204P
117
Temperature Probes
-Ambient-
-Pipe-
-Ground-
131
131
Pressure Down Solenoid Relays
320
320
Secondary Processor 204S
131
Pressure Up Solenoid Wires
141
141
122
123

METHOD FOR TESTING PIPELINES

BACKGROUND

Many fluid materials, such as oil, gas, water, and the like are transferred and/or supplied using pipelines of various sizes and types. Some pipelines run under ground, some run under water, some run above ground, and some are elevated above ground level. Pipelines are used extensively to transport liquid and gaseous materials that can be critical to commerce, industry, and various public and private services.

A significant concern when using pipelines to transport materials is that the pipe and pipe fixtures making up the pipeline must be reliable and safe. To this end, extensive testing of the pipe and pipe fixtures making up the pipeline must be conducted before the pipeline is used, and/or at regular intervals after the pipeline is in operation, and after any repairs or changes are made to any of the pipes and pipe fixtures making up the pipeline. This is particularly critical given that many pipelines carry fluids, e.g., liquids or gases that can be very valuable, and/or can be toxic, flammable, and/or whose contents could cause extensive damage if released.

Pipeline testing is typically done via pressure tests of the pipes, pipe connections, and pipe fittings before the pipeline is actually used to carry the intended fluids, i.e., before pipe and pipe fixtures making up the pipeline are put to use. Some pipeline tests are conducted before the pipes are put into place, e.g., at the point of manufacture/fabrication. Other pipeline tests are conducted in the field after the pipeline is put into place for the intended use, but before the pipeline is actually used. Still other pipeline tests are conducted as regular maintenance after the pipeline is in operation, or after repairs or changes have been made in the field.

In the prior art, pipeline testing was typically performed by filling the pipeline section to be tested with a relatively harmless test medium such as water or nitrogen. Then pressure is raised in the pipeline section to be tested by pumping additional test medium, such as water or a non-reactive gas such as nitrogen, into the pipeline section to be tested until the pressure in the pipeline section to be tested is raised to a desired test pressure.

The traditional methods for testing pipelines rely heavily on human intervention, e.g., human monitoring of various gauges, human communication, the manual turning on and off of various valves by humans, etc. In addition, traditional methods for testing pipelines typically use mechanical manually operated safety devices such as manually operated valves, mechanical emergency relief valves, and/or rupture disks set to a specific pressure, as well as mechanical gauges that must be visually observed and monitored by humans.

Unfortunately, human beings, as well as prior art mechanical devices, can be unreliable and slow to react. In addition, in many cases, once prior art mechanical safety devices, such as rupture disks and safety valves, are actuated/used, they must be manually reset and/or replaced; again, by manual human activity. This represents several very real safety issues for the workers performing the tests, the pipeline being tested, and, in some cases, even the surrounding community. It is also an inefficient use of resources such as time, man-hours, and materials.

For instance, the need for multiple workers to be positioned at multiple gauge monitoring locations and various valve locations so that the valves can be manually operated by the workers when needed can, in some instances, put those workers at risk. In addition, slow human and mechanical reaction times, coupled with potential human error, can mean that issues, such as over pressure, or a sudden drop in pressure due to a leak or catastrophic failure, may not be recognized immediately. To make matters worse, even when recognized, the prior art human/manual reaction to these conditions is typically slow due to the human communications involved and the delay introduced by the manual operation of valves. This is a problem not only in terms of safety but also in terms of mitigating damage to the system when there is a failure event.

The prior art use of human operators to monitor the various test parameters is also potentially problematic for several reasons. For instance, in the prior art it often happens that a human operator fails to immediately notice that a given test parameter is outside the defined limit. Given that these pipeline tests can take many hours, often 24 or more hours, it is not hard to understand why a worker might not be able to remain as focused as he or she should be and how a deviation in a parameter reading might be missed.

Understandable or not, missing a deviation in a critical parameter can result in several significant problems. First, it could result in a system blow out and injury to any of the multiple workers at various locations required by prior art systems. In addition, missing a deviation in a critical parameter can result in unnecessary damage to the pipeline and/or testing equipment. In addition, missing a deviation in a critical parameter can result in the entire test having to be re-run to identify exactly when the failure occurred and why. Also as discussed above, even when a deviation is detected, the time delay associated with human communication and then the manual manipulation of valves and safety mechanisms is also a problem, even when everything goes according to plan. Consequently, the prior art reliance on human operators and monitors is a significant safety and efficiency issue when using prior art testing methods.

In addition, prior art pipeline testing methods and systems typically relied on analog chart recorders, dead weights, and various other mechanical/manual mechanisms. This, in and of itself, results in inherent inaccuracy of information. However, to make matters worse, prior art systems typically use manual recordation of test information on various forms, i.e., the test information is not collected directly from the pipe or test equipment but is instead recorded manually by humans based largely on human observations. Clearly this is subject to not only human error but also human manipulation. This can result in inaccurate information being provided to the pipeline owner and/or the various governing bodies which require this information to be stored and made available for auditing. This is not only inefficient and ineffective, but it can also represent a safety issue for pipeline workers and/or the public.

In addition, using prior art testing systems, once a test is completed, a testing technician typically manually compiles the testing information into a report that is submitted to an on-site inspector. The inspector then reviews the report and submits it to the client/pipeline owner for approval. In most situations the client has no knowledge of how a pressure test has gone until they receive and review the test report. In short, there is a significant time delay, and virtually no-real time monitoring capability for the client, or anyone else not at the testing site.

In summary, prior art pipeline testing systems suffer from several serious, and potentially dangerous, issues including, but not limited to, inherent worker safety issues posed by the need for workers to be positioned at various manual gauge monitoring and valve operation stations; potential for human error and delays in test system parameter monitoring, reactions, and recording of information; reliance on often unreliable, inaccurate, and time consuming mechanical safety devices; no automatic safety override systems; a lack of backup systems and/or redundancy of components; no real time remote monitoring for clients, and the associated delays in approval and/or action; reliance on human based communications; information recording mechanisms that are highly subject to human error and/or human manipulation; no systematic and efficient means for creating standardized information and storing of testing information; labor intensive and inefficient implementation; and a general lack of effectiveness, efficiency, and accuracy that makes prior art pipeline testing systems expensive to operate and often unreliable.

What is needed is a method and system to solve the long standing on-going technical problem of safely, accurately, effectively, and efficiently testing pipelines that protects the public, testing workers, the equipment being tested, and the materials being transported by minimizing opportunities for human error and reliance on manual safety devices.

SUMMARY

The disclosed embodiments provide a solution to the long-standing technical problem of providing methods and systems for safely, accurately, effectively, and efficiently testing pipelines while protecting the public, testing workers, the equipment being tested, and the materials being transported by minimizing opportunities for human error and reliance on manual safety devices.

To this end, disclosed herein is a method and system for pipeline testing that includes an integrated system of software and hardware for automatically testing pipelines, fabrications, and pipeline system components in compliance with Federal Code 49 CFR Parts 192 and 195.

As used herein the terms "pipeline testing," or "testing pipelines," or "pipeline pressure testing," are used interchangeably and include, but are not limited to, any type of pipeline testing, fabrication testing, pipeline system component testing, pipeline pressure testing, fabrication pressure testing, pipeline system component pressure testing, and/or any other method and/or system of pipeline, fabrication, and/or pipeline system component testing, as discussed herein, and/or as is known in the art at the time of filing, and/or as is developed after the time of filing.

As used herein the term "fluid" includes any substance in a substantially non solid-state including, but not limited to gases, liquids and/or solids being emersed in and/or conveyed by gases or liquids.

In various embodiments, the disclosed method and system for pipeline testing uses an electronics control module to implement a pipeline test according to operational parameters and requirements. In one embodiment, as the test is run, the electronics control module monitors real time data from remote sensors and compares the remote sensor data to control parameter input data that includes data indicating acceptable testing operations and parameter ranges.

In one embodiment, in response to the comparison of the real time sensor data and the control parameter input data, the electronics control module generates various control signals used to control an automated fluid control system to regulate the pressure in the pipeline section being tested and, if necessary, instigate an emergency shutdown of the test and to release all pressure from the pipeline section being tested. In one embodiment, all test data is recorded, stored, and made available as needed/desired.

In one embodiment, the disclosed method and system for pipeline testing uses an electronics control module, including one or more processing components such as Programable Logic Controllers (PLCs). In one embodiment, the one or more processing components are redundant components designed to ensure continuous operation of the testing functions.

In one embodiment, the one or more processing components receive control parameter input data from a control parameters data input system that in one embodiment, is Human/Machine Interface (HMI). In various embodiments, the control parameter input data includes, but is not limited to data directing the automatic operation and running of the test, as well as data indicating acceptable pressure ranges, temperature ranges, test times and limits, and/or any other test parameter data and data ranges desired.

In one embodiment, multiple sensors are used with the method and system for pipeline testing including, but not limited to, redundant pressure sensors, various temperature sensors, and/or any other remote and/or local sensors for obtaining real time sensor data for monitoring any test parameters desired and ensuring the pressure test is run safely and as desired.

In one embodiment, the one or more processing components receive relative real-time sensor data from the various sensors and then compare the sensor data to the control parameter input data.

In one embodiment, in response to the comparison of the real time sensor data and the control parameter input data, the electronics control module generates various control signals used to control an automated fluid control system.

In one embodiment, the fluid control system includes a pressure up sub-system and a pressure down sub-system. In one embodiment, in response to the control signals from the electronics control module, the pressure up sub-system can automatically add pressure to the components, such as a section of pipe, being tested or the pressure down sub-system can automatically bleed off pressure from the components being tested.

In one embodiment, when the electronics control module determines that the sensor data has deviated from limits defined by the control parameter input data, the electronics control module automatically sends the appropriate control signal to the fluid control system to ensure the situation is rectified automatically in relative real time, i.e., with minimal time delay, so the test remains safe and accurate.

In one embodiment, if the electronics control module determines that the sensor data has deviated from the limits defined in by the control parameter input data in such a way that a defined unsafe or an emergency condition exists, the electronics control module automatically generates an emergency shut down control signal that causes the pressure down sub-system to automatically bleed off pressure from the section of the pipeline being tested immediately and shut down the test. In one embodiment, there is also a manual emergency shutdown device that can be manually activated to generate the emergency shut down control signal to immediately make the pressure down sub-system bleed off pressure from the section of pipeline being tested.

In one embodiment, the electronics control module also time stamps and records all the sensor data in real-time and maintains a record of all sensor data, actions taken, and test parameters throughout the entire test.

In one embodiment, the disclosed method and system for pipeline testing includes one or more integrated communications lines to connect workers with each other and the system and to connect the various system components with each other. In one embodiment, the disclosed method and system for pipeline testing includes one or more external data transmitters to relay test data to a server and/or remote display for real time display of the test data to remote users, such as a client/pipeline system owner or another party or agency.

In one embodiment, the disclosed method and system for pipeline testing uses a mobile testing trailer to house the various test components disclosed herein.

As discussed in more detail below, the disclosed method and system for pipeline testing addresses and mitigates or negates the issues associated with prior art pipeline testing methods and systems.

In particular, the disclosed method and system for pipeline testing eliminates the need for workers at various manual monitoring stations and valve operation stations by incorporating an automated fluid control system and remote sensors for collecting sensor data. In this way, using the disclosed embodiments, monitoring is performed by electronic sensors and the pipe pressure is automatically and remotely controlled by the fluid control system in response to the control signals from the electronics control module, all without the need for human action/intervention. Consequently, fewer workers are required and those workers do not need to be stationed at various manual monitoring and valve stations, or near the pipeline section being tested. This represents a significant safety advantage and largely eliminates the time delays encountered using prior art systems.

In addition, by incorporating an electronics control module, an automated fluid control system, and remote electronic sensors, the disclosed method and system for pipeline testing largely eliminates the potential for human error, as well as the delays in test system parameter monitoring, long reaction times, and inaccurate recording of information associated with prior art systems.

In addition, by incorporating an electronics control module, an automated fluid control system, and remote electronic sensors, the disclosed method and system for pipeline testing minimizes the prior art reliance on often unreliable, inaccurate, and time-consuming mechanical safety devices and the need to replace many of these components after they have been activated.

In addition, as discussed above, and in more detail below, in contrast to the prior art, one embodiment of the disclosed method and system for pipeline testing provides redundant safety override systems including both an automatic and manual safety override/shutdown mechanism.

In addition, as discussed above, and in more detail below, in contrast to the prior art, one embodiment of the disclosed method and system for pipeline testing provides backup systems and/or redundancy of components.

In addition, as discussed above, and in more detail below, in contrast to the prior art, one embodiment of the disclosed method and system for pipeline testing provides a real time remote monitoring capability for clients and an integrated communications system to minimize the communication delays associated with prior art systems.

In addition, as discussed above, and in more detail below, in contrast to the prior art, one embodiment of the disclosed method and system for pipeline testing provides an automatic data recording mechanism that is not subject to human error and/or human manipulation and provides a systematic and efficient mechanism for creating standardized test data and storing that data securely.

For these and many other reasons discussed herein, and in more detail below, the disclosed method and system for pipeline testing solves the long standing and on-going technical problem of safely, accurately, effectively, and efficiently testing pipelines that also protects the public, workers, equipment being tested, and materials being transported by minimizing delays, opportunities for human error, and the reliance on manual safety devices.

Figure 1:
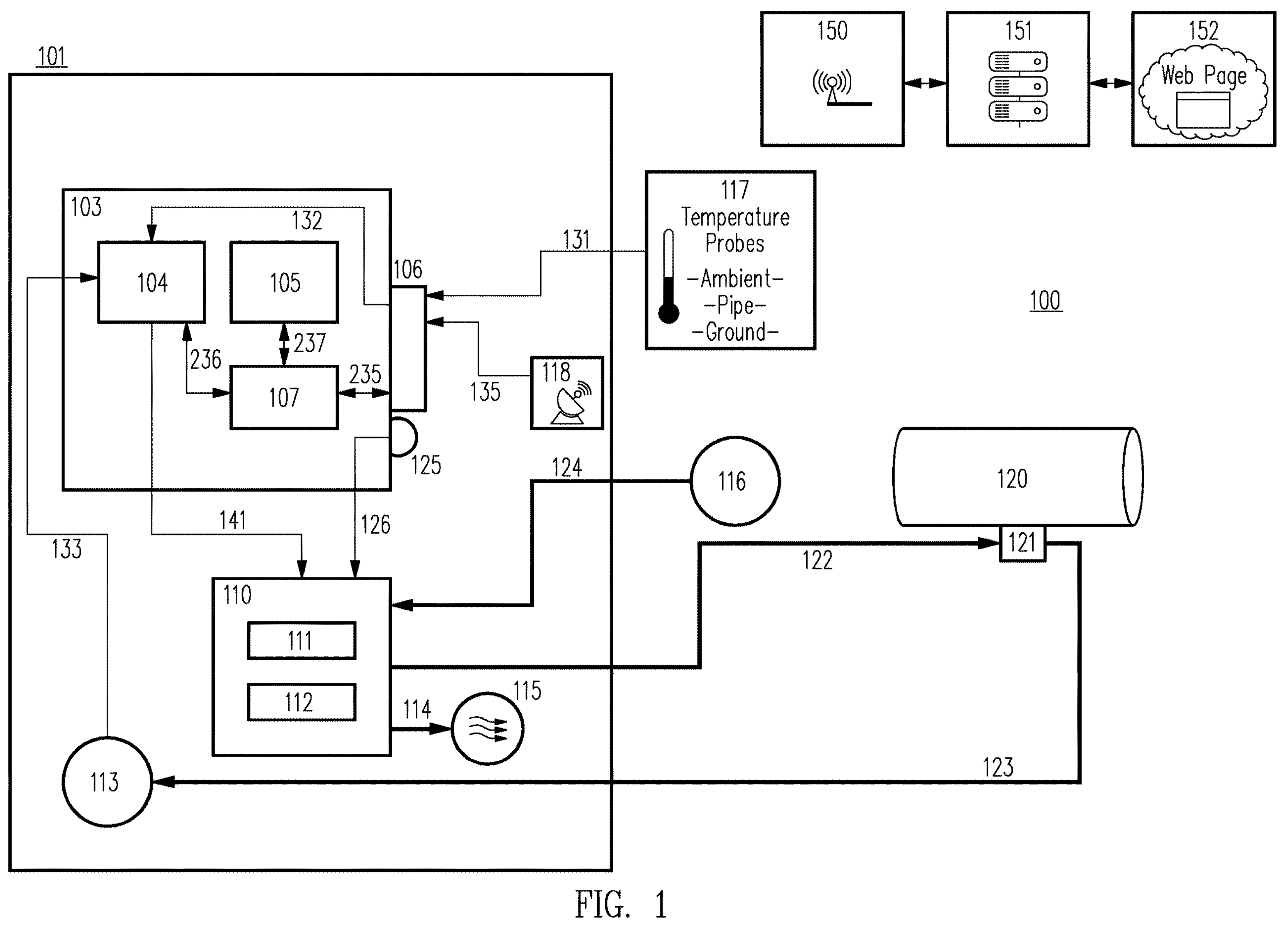
FIG. 1 is a high-level block diagram of a system for pipeline testing in accordance with one embodiment.

Common reference numerals are used throughout the figures (FIGs.) and the detailed description to indicate like elements. One skilled in the art will readily recognize the above FIGs. are examples and that other processes, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict exemplary embodiments. Embodiments may be embodied in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

As used herein the terms "pipeline testing," or "testing pipelines," or "pipeline pressure testing," are used interchangeably and include, but are not limited to, any type of pipeline testing, fabrication testing, pipeline system component testing, pipeline pressure testing, fabrication pressure testing, pipeline system component pressure testing, and/or any other method and/or system of pipeline, fabrication, and/or pipeline system component testing, as discussed herein, and/or as is known in the art at the time of filing, and/or as is developed after the time of filing.

As used herein the term "fluid" includes any substance in a substantially non solid-state including, but not limited to gases, liquids and/or solids being emersed in and/or conveyed by gases or liquids.

The disclosed embodiments provide a solution to the long-standing technical problem of providing methods and systems for safely, accurately, effectively, and efficiently testing pipelines while protecting the public, testing workers, the equipment being tested, and the materials being transported by minimizing opportunities for human error and reliance on manual safety devices.

To this end, disclosed herein is a method and system for pipeline testing that includes an integrated system of software and hardware for automatically testing in compliance with Federal Code 49 CFR Parts 192 and 195.

In various embodiments, the disclosed method and system for pipeline testing uses an electronics control module to implement a pipeline test according to operational parameters and requirements. In one embodiment, as the test is run, the electronics control module monitors real time data from remote sensors and compares the remote sensor data to control parameter input data that includes data indicating acceptable testing operations and parameter ranges.

In one embodiment, in response to the comparison of the real time sensor data and the control parameter input data, the electronics control module generates various control signals used to control an automated fluid control system to regulate the pressure in the pipeline section being tested and, if necessary, instigate an emergency shutdown of the test and to release all pressure from the pipeline section being tested. In one embodiment, all test data is recorded, stored, and made available as needed/desired.

In one embodiment, the disclosed method and system for pipeline testing uses an electronics control module, including one or more processing components such as Programable Logic Controllers (PLCs). In one embodiment, the one or more processing components are redundant components designed to ensure continuous operation of the testing functions.

In one embodiment, the one or more processing components receive control parameter input data from a control parameters data input system that in one embodiment, is Human/Machine Interface (HMI). In various embodiments, the control parameter input data includes, but is not limited to data directing the automatic operation and running of the test, as well as data indicating acceptable pressure ranges, temperature ranges, test times and limits, and/or any other test parameter data and data ranges desired.

In one embodiment, multiple sensors are used with the method and system for pipeline testing including, but not limited to, redundant pressure sensors, various temperature sensors, and/or any other remote and/or local sensors for obtaining real time sensor data for monitoring any test parameters desired and ensuring the pressure test is run safely and as desired.

In one embodiment, the one or more processing components receive relative real-time sensor data from the various sensors and then compare the sensor data to the control parameter input data.

In one embodiment, in response to the comparison of the real time sensor data and the control parameter input data, the electronics control module generates various control signals used to control an automated fluid control system.

In one embodiment, the fluid control system includes a pressure up sub-system and a pressure down sub-system. In one embodiment, in response to the control signals from the electronics control module, the pressure up sub-system can automatically add pressure to the pipeline section being tested or the pressure down sub-system can automatically bleed off pressure from the pipeline section being tested.

In one embodiment, when the electronics control module determines that the sensor data has deviated from limits defined by the control parameter input data, the electronics control module automatically sends the appropriate control signal to the fluid control system to ensure the situation is rectified automatically in relative real time, i.e., with minimal time delay, so the test remains safe and accurate.

In one embodiment, if the electronics control module determines that the sensor data has deviated from the limits defined in by the control parameter input data in such a way that a defined unsafe or an emergency condition exists, the electronics control module automatically generates an emergency shut down control signal that causes the pressure down sub-system to automatically bleed off pressure from the section of the pipeline being tested immediately and shut down the test. In one embodiment, there is also a manual emergency shutdown device that can be manually activated to generate the emergency shut down control signal to immediately make the pressure down sub-system bleed off pressure from the section of pipeline being tested.

In one embodiment, the electronics control module also time stamps and records all the sensor data in real-time and maintains a record of all sensor data, actions taken, and test parameters throughout the entire test.

In one embodiment, the disclosed method and system for pipeline testing includes one or more integrated communications lines to connect workers with each other and the system and to connect the various system components with each other. In one embodiment, the disclosed method and system for pipeline testing includes one or more external data transmitters to relay test data to a server and/or remote display for real time display of the test data to remote users, such as a client/pipeline system owner or another party or agency.

In one embodiment, the disclosed method and system for pipeline testing uses a mobile testing trailer to house the various test components disclosed herein.

As discussed in more detail below, the disclosed method and system for pipeline testing addresses and mitigates or negates the issues associated with prior art pipeline testing methods and systems.

High Level General System

FIG. 1 is a high-level block diagram of a system for pipeline testing 100 in accordance with one embodiment.

As seen in FIG. 1, in one embodiment, system for pipeline testing 100 includes test trailer 101. A picture of one embodiment of test trailer 101 is shown in FIGS. 7, 8, 9, and 10 which are discussed in more detail below.

Housing the testing components discussed below in test trailer 101 has numerous advantages including, but not limited to, the ability to move system for pipeline testing 100 from job site to job site, from fabrication facility to the pipelines in the field, and from pipeline section to pipeline section as the entire pipeline is tested.

As discussed below, in various embodiments, test trailer 101 is self-sufficient and capable of providing test data to remote locations in relative real time.

As seen in FIG. 1, in one embodiment, test trailer 101 houses electronics control module 103, fluid control system 110, pressure sensors 113, access panel 106, and trailer communications system 118.

As also seen in FIG. 1, in one embodiment, electronics control module 103 includes processor element 104, control parameters data input system 105, hub 107, Emergency Stop Device (ESD) 125, and access panel 106.

In one embodiment, processor element 104 includes one or more processors (not shown) such as, but not limited to, Programable Logic Controllers (PLCs). In one embodiment, the one or more processing components are redundant components designed to ensure continuous operation of the testing functions. One specific embodiment of processor element 104 is discussed in more detail below with respect to FIGS. 2 and 4, and 6.

Returning to FIG. 1, in one embodiment, control parameters data input system 105 is a Human/Machine Interface (HMI) through which an operator can enter test control parameter input data (not shown). As discussed in more detail below, the control parameter input data includes, but is not limited to, data for direction and conducting the pressure test desired in the way desired and data indicating acceptable pressure ranges, temperature ranges, test times and limits, and/or any other test parameter data and data ranges desired.

As discussed in more detail below, in one embodiment, hub 107 facilitates communications between operators and sub-systems via communication lines 235, 236, and 237, as well as various off-site communications, display, and data transfer functions via communication line 235, access panel 106 and communications/data line 135.

As discussed in more detail below, access panel 106 receives temperature data from temperature sensors 117 via temperature data line 131 and provides this data to processor element 104 via temperature data line 132. In addition, in one embodiment, access panel 106 relays communications between operators and sub-systems as well as various off-site communications, display, and data transfer functions to trailer communications system 118 via communications/data line 135.

As also seen in FIG. 1 and discussed in more detail below, in one embodiment, system for pipeline testing 100 also includes pressure sensors 113 that receive pressure data from the section of pipe being tested 120 via hose connect 121 and sense hose 123. Pressure sensors 113 then relay pressure data to processor element 104 via pressure data line 133.

As discussed in more detail below, in one embodiment, multiple sensors are used with system for pipeline testing 100 including, but not limited to redundant pressure sensors 113, various temperature sensors 117, and/or any other remote and/or local sensors for obtaining real time sensor data for monitoring any test parameters desired.

In one embodiment, the one or more processing components of processor element 104 receive sensor data from the various sensors, including pressure sensors 113 and temperature sensors 117 and then compare the sensor data to the control parameter input data from control parameters data input system 105.

As also seen in FIG. 1 and discussed in more detail below, in one embodiment, system for pipeline testing 100 also includes fluid control system 110.

As seen in FIG. 1, in one embodiment, a pressurized test medium source 116 is connected to fluid control system 110 via line 124. In various embodiments, pressurized test medium source 116 can be any source of pressurized test medium such as a water or other liquid pump, and/or a source of high-pressure gas, such as a nitrogen tank, or any other source of pressurized test medium as discussed herein, and/or as known in the art at the time of filing, and/or as developed/made available after the time of filing.

In one embodiment, fluid control system 110 receives control signals from processor element 104 of electronics control module 103 via control signal data line 141.

As seen in FIG. 1, and as discussed in more detail below, in one embodiment, fluid control system 110 includes a pressure up sub-system 111. In one embodiment, pressure up sub-system is used for increasing the flow of test medium from pressurized test medium source 116 via pressure line 122 and hose connect 121, to increase the pressure in section of pipe to be tested 120 in response to control signals on control signal data line 141 from a control system such processor element 104 of electronics control module 103.

As also seen in FIG. 1, and as discussed in more detail below, in one embodiment, fluid control system 110 includes and a pressure down sub-system 112 for bleeding off pressure in section of pipe to be tested 120 in response to control signals on control signal data line 141 from a control system such processor element 104 of electronics control module 103, using vent line 114 and vent 115.

As discussed in more detail below, in one embodiment, fluid control system 110 can be any system capable of automatically increasing or decreasing pressure levels in section of pipe to be tested 120 in response to control signals from a control system such processor element 104 of electronics control module 103. As discussed below, in one specific illustrative example, fluid control system 110 can include one or more valves controlled by solenoids or any other remote valve control system responding to control signals, as discussed herein, and/or as known in the art at the time of filing, and/or as developed/made available after the time of filing.

As also discussed in more detail below, in one embodiment, if processor element 104 of electronics control module 103 determines that the sensor data has deviated from the limits defined in by the control parameter input data in such a way that a defined emergency condition exists, electronics control module 103 automatically generates an emergency shut down control signal on control signal data line 141 that causes the pressure down sub-system 112 of fluid control system 110 to automatically bleed off pressure from the pipe section being tested 120 via vent line 114 and vent 115 immediately.

In addition, in one embodiment, system for pipeline testing 100 includes Emergency Shutdown Device (ESD) 125 that provides a manual emergency shutdown mechanism that can be manually activated to generate the emergency shut down control signal on line 126 to make the pressure down sub-system 112 bleed off pressure from section of pipe to be tested 120 via vent line 114 and vent 115 immediately.

As seen in FIG. 1, in one embodiment, system for pipeline testing 100 includes remote communications system 150, server 151, and remote display 152. In one embodiment, remote communications system 150 receives data from trailer communications system 118 and relays the data to server 151. In one embodiment, the data is then made available to remote display 152 for viewing remotely, in relative real time.

High Level General Operation

Referring again to FIG. 1, in the operation of one embodiment, a section of pipe to be tested 120 is filled with a test medium. In various embodiment, the test medium is typically water or nitrogen, or any other test medium as discussed herein, and/or as known in the art at the time of filing, and/or as made known/available after the time of filing. In addition, hose connect 121 is attached to the section of pipe to be tested 120.

In one embodiment, pressurized test medium source 116 is provided and connected to fluid control system 110, typically to pressure up sub-system 111 of fluid control system 110, via line 124.

In one embodiment, pressure hose 122 is also connected to control system 110, typically to pressure up sub-system 111 and pressure down sub-system 112 of fluid control system 110.

In one embodiment, the combination of pressurized test medium source 116, line 124, fluid control system 110, pressure hose 122, vent line 114, vent 115 and hose connect 121 is used to supply high pressure test medium, such as water or gas to section of pipe to be tested 120 in order to raise the pressure inside section of pipe to be tested 120 and, when needed, to bleed off pressure using vent line 114 and vent 115 as directed by control signals on control signal data line 141 from electronics control module 103.

In one embodiment, control parameters data input system 105 is then used to enter test control parameter input data (not shown). In one embodiment, control parameters data input system 105 is an HMI through which an operator can enter test control parameter input data (not shown).

In one embodiment, the control parameter input data includes, but is not limited to data including acceptable pressure ranges, temperature ranges, test times and limits, and/or any other test parameter data and data ranges desired.

In addition, in one embodiment, control parameter input data includes test operations data indicating test operational control data such as test length, test pressures, pressure ramp up and ramp down controls, wait time controls and various other data used to control and conduct the desired pressure test in the desired manner.

In one embodiment, control parameter input data is relayed to processor element 104 via hub 107 and data line 236. As noted above, in one embodiment, processor element 104 includes one or more processors (not shown) such as, but not limited to, Programable Logic Controllers (PLCs). In one embodiment, the one or more processing components are redundant components designed to ensure continuous operation of the testing functions.

In one embodiment, multiple sensors are provided and placed as needed. In one embodiment, the sensors are remote sensors including, but not limited to redundant pressure sensors 113, various temperature sensors 117, and/or any other remote and/or local sensors for obtaining real time sensor data for monitoring any test parameters desired.

In one embodiment, under the direction of the control parameter input data and electronics control module 103 a pressure test is begun. As the test is begun, electronics control module 103 generates various control signals that are sent to fluid control system 110 via control signal data line 141, to begin adding pressure to section of pipe to be tested 120 via pressurized test medium source 116, line 124, fluid control system 110, and pressure hose 122.

In one embodiment, as the test is run, processor element 104 of electronics control module 103 is used to monitor data from remote sensors, including pressure sensors 113 and temperature sensors 117, and compare the remote sensor data to control parameter input data from control parameters data input system 105 that includes data indicating acceptable testing parameter ranges while it runs the test in accordance with the test operation data of the control parameter input data.

In one embodiment, in response to the comparison of the real time sensor data and the control parameter input data, the electronics control module 103 generates various control signals that are sent to fluid control system 110 via control signal data line 141. In response to the control signals from control signal data line 141, pressure up sub-system 111 or pressure down sub-system 112 of fluid control system 110 are selectively activated to regulate the pressure in the pipeline section being tested 120 and, if necessary, instigate an emergency shutdown of the test and to release all pressure from the pipeline section being tested. In one embodiment, all test data is recorded, stored, and made available as needed/desired by electronics control module 103.

In one embodiment, when electronics control module 103 determines that the sensor data has deviated from the limits defined by the control parameter input data, electronics control module 103 automatically sends the appropriate control signal to the fluid control system 110 via control signal data line 141 to ensure the situation is rectified quickly and automatically so the test remains safe and accurate.

In one embodiment, if electronics control module 103 determines that the sensor data has deviated from the limits defined in by the control parameter input data in such a way that a defined emergency condition exists, electronics control module 103 automatically generates an emergency shut down control signal on control signal data line 141 that causes pressure down sub-system 112 to automatically bleed off pressure from the pipe section being tested 120 via vent line 114 and vent 115, to immediately shut down the test.

As noted above, in one embodiment, there is also a manual Emergency Shutdown Device 125, ESD 125, that can be manually activated to generate the emergency shut down control signal on data line 126 to make the pressure down sub-system 112 bleed off pressure from the pipe section being tested 120 immediately via vent line 114 and vent 115.

As discussed in more detail below, in one embodiment, electronics control module 103 also time stamps and records all the sensor data in real-time and maintains a record of all sensor data, actions taken, and test parameters throughout the entire test.

In one embodiment, the disclosed method and system for pipeline testing includes one or more integrated communications lines 236, 237, and 235 to connect workers with each other as well as to connect the various system 100 components via hub 107.

As noted above, in one embodiment, system for pipeline testing 100 includes remote communications system 150, server 151, and remote display 152. In one embodiment, remote communications system 150 receives data from trailer communications system 118 and relays the data to server 151. In one embodiment, trailer communications system 118 and remote communications system 150 are connected by satellite, cell towers, and/or any other wireless communications system. In one embodiment, the data is then made available to remote display 152 for viewing remotely, in relative real time.

In one embodiment, the disclosed method and system for pipeline testing uses a mobile testing trailer to house the various test components disclosed herein.

The disclosed system for pipeline testing 100 addresses and mitigates or negates the issues associated with prior art pipeline testing methods and systems.

In particular, system for pipeline testing 100 eliminates the need for workers at various manual monitoring stations and valve operation stations by incorporating an automated fluid control system and remote sensors for collecting sensor data. In this way, using system for pipeline testing 100, monitoring is performed by electronic sensors and the pipe pressure is automatically and remotely controlled in response to the control signals from the electronics control module, all without the need for human action/intervention. Consequently, fewer workers are required and those workers do not need to be stationed at various manual monitoring and valve stations, or near the pipeline section being tested. This represents a significant safety advantage and largely eliminates the time delays encountered using prior art systems.

In addition, by incorporating an electronics control module, an automated fluid control system, and remote electronic sensors, system for pipeline testing 100 largely eliminates the potential for human error, as well as the delays in test system parameter monitoring, long reaction times, and inaccurate recording of information associated with prior art systems.

In addition, by incorporating an electronics control module, an automated fluid control system, and remote electronic sensors system for pipeline testing 100 minimizes the prior art reliance on often unreliable, inaccurate, and time-consuming mechanical safety devices and the need to replace many of these components after they have been activated.

In addition, as discussed above, and in more detail below, in contrast to the prior art, one embodiment of system for pipeline testing 100 provides redundant safety override systems including both an automatic and manual safety override/shutdown mechanism.

In addition, as discussed above, and in more detail below, in contrast to the prior art, system for pipeline testing 100 provides backup systems and/or redundancy of components.

In addition, as discussed above, and in more detail below, in contrast to the prior art, system for pipeline testing 100 provides a real time remote monitoring capability for clients and an integrated communications system to minimize the communication delays associated with prior art systems.

In addition, as discussed above, and in more detail below, in contrast to the prior art, system for pipeline testing 100 provides a data recording mechanism that is not subject to human error and/or human manipulation and provides a systematic and efficient mechanism for creating standardized test data and storing that data securely.

For these and many other reasons discussed herein, and in more detail below, system for pipeline testing 100 solves the long standing and on-going technical problem of safely, accurately, effectively, and efficiently testing pipelines that also protects the public, workers, equipment being tested, and materials being transported by minimizing delays, opportunities for human error, and the reliance on manual safety devices.

In some embodiments, the fluid control system 110 used with the disclosed methods and systems for pipeline testing includes solenoid-controlled valves and the processor element 104 of electronic control module 103 includes one or more Programable logic Controllers (PLCs).

FIGS. 2, 3, 4, 5, and 6 depict one specific example of one embodiment of a system for pipeline testing 200 that utilizes solenoid-controlled valves as part of the fluid control system 110 and two PLCs as the processor element 104 of the electronic control module 103.

Figure 2:
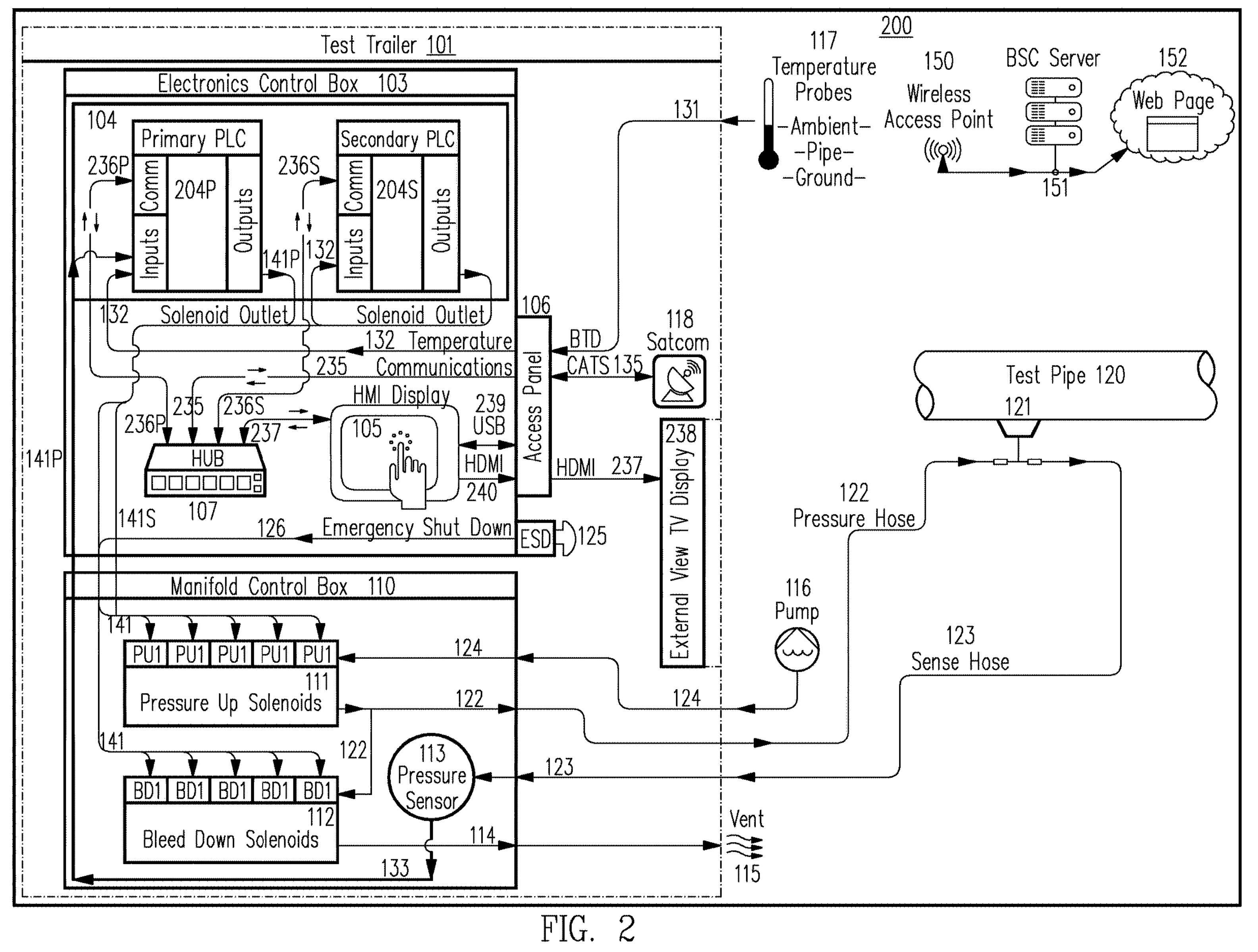
FIG. 2 is a block diagram of a specific example of a system for pipeline testing in accordance with one embodiment.
Figure 3A:
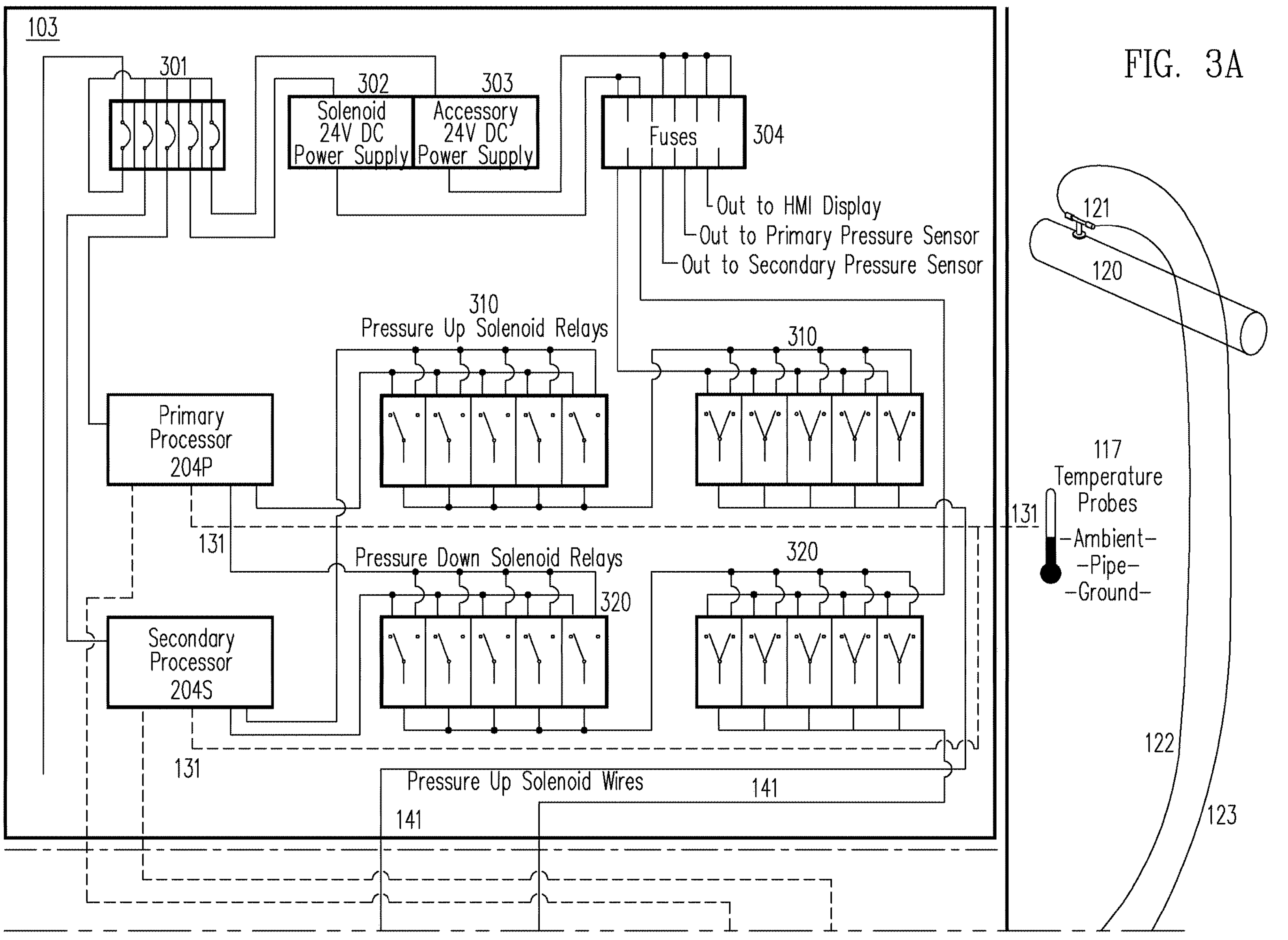
FIG. 3 is a diagram of a specific example of an electronics control module and automatic fluid control system of one specific example of a system for pipeline testing in accordance with one embodiment.
Figure 3B:
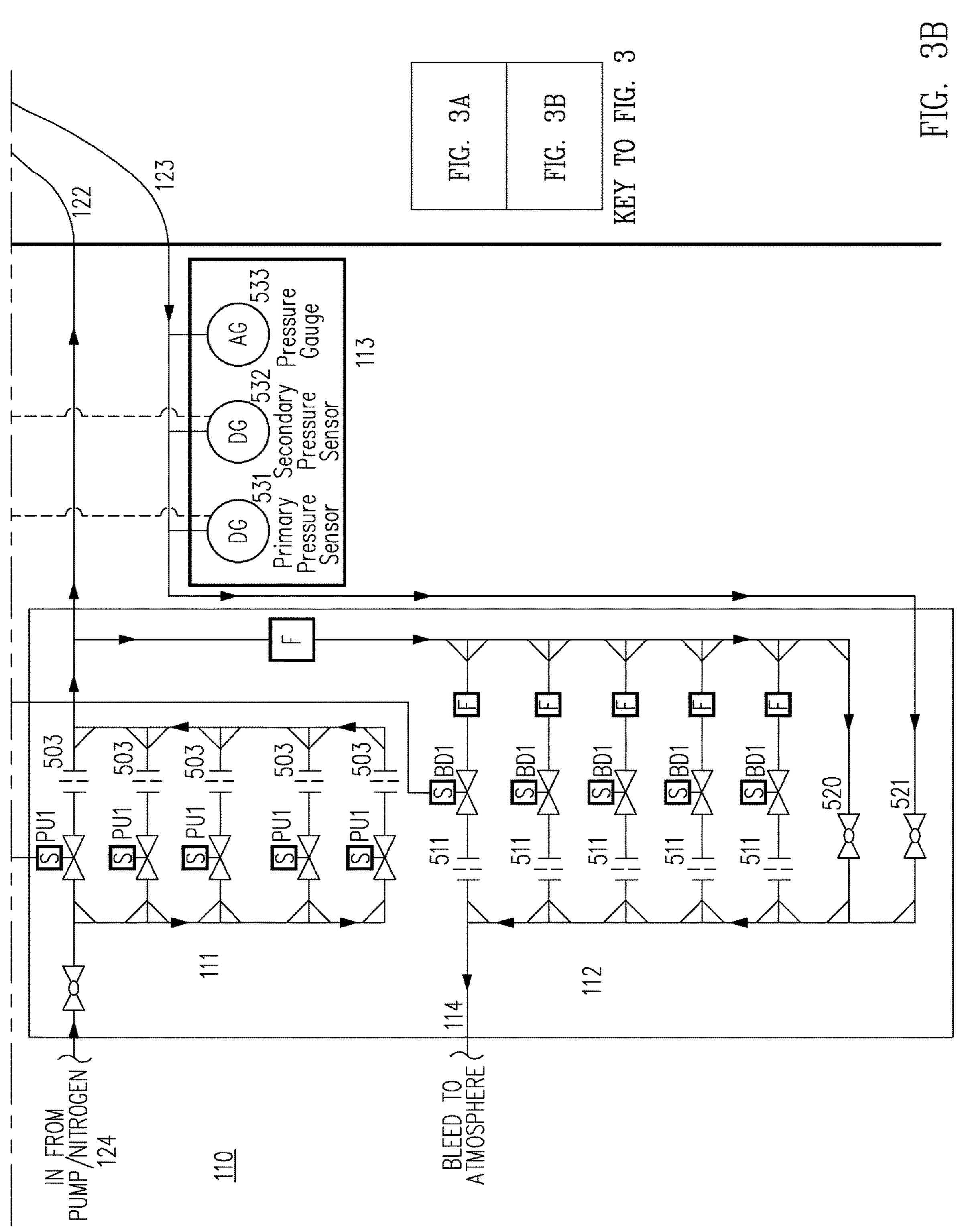
Figure 4:
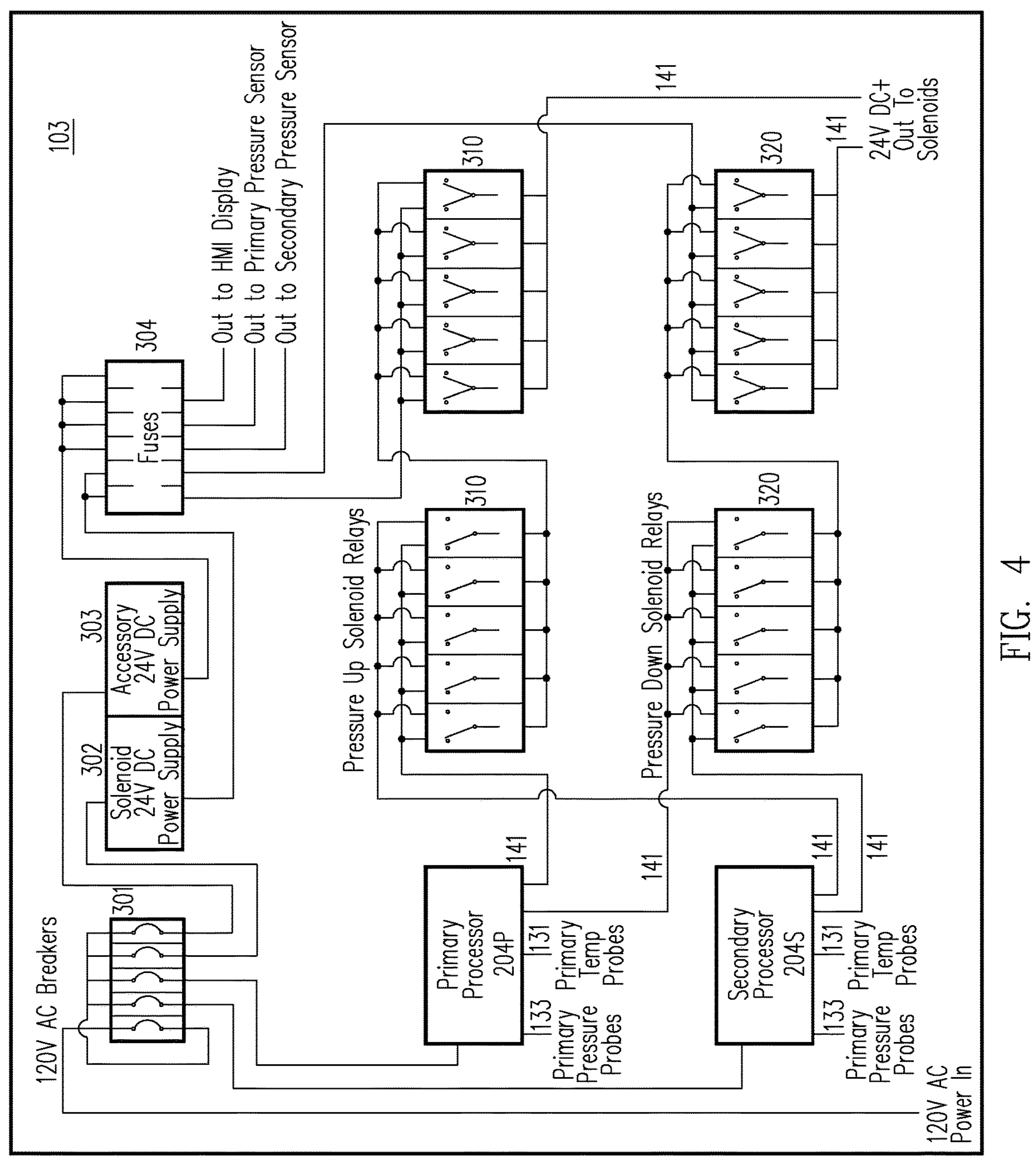
FIG. 4 is a diagram of an electronics layout of one specific example of an electronics control module of one specific example of a system for pipeline testing in accordance with one embodiment.
Figure 5:
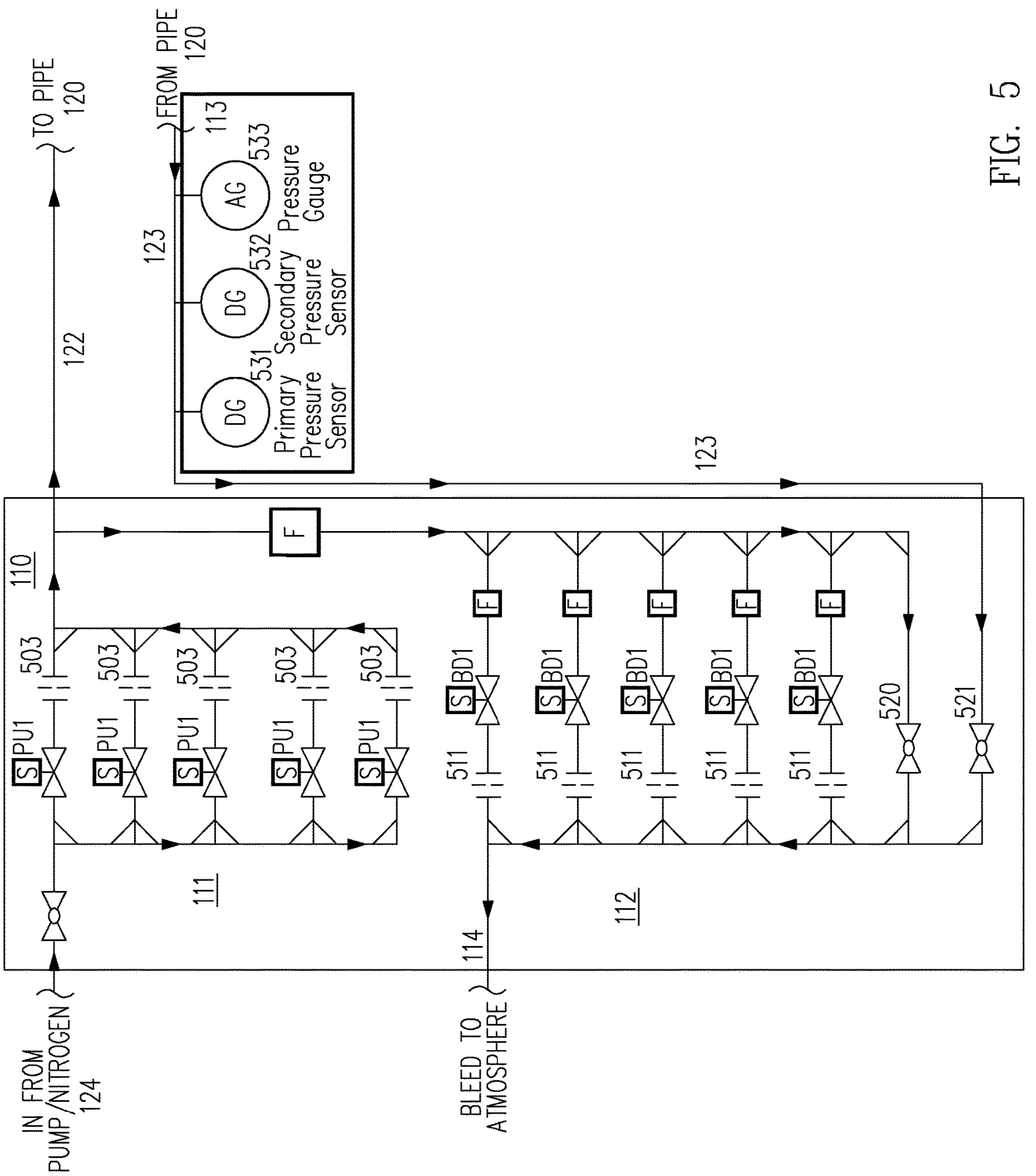
FIG. 5 is one specific example of a Piping and Instrument (P and I) diagram of one specific example of an automatic fluid control system of one specific example of a system for pipeline testing in accordance with one embodiment.
Figure 6:
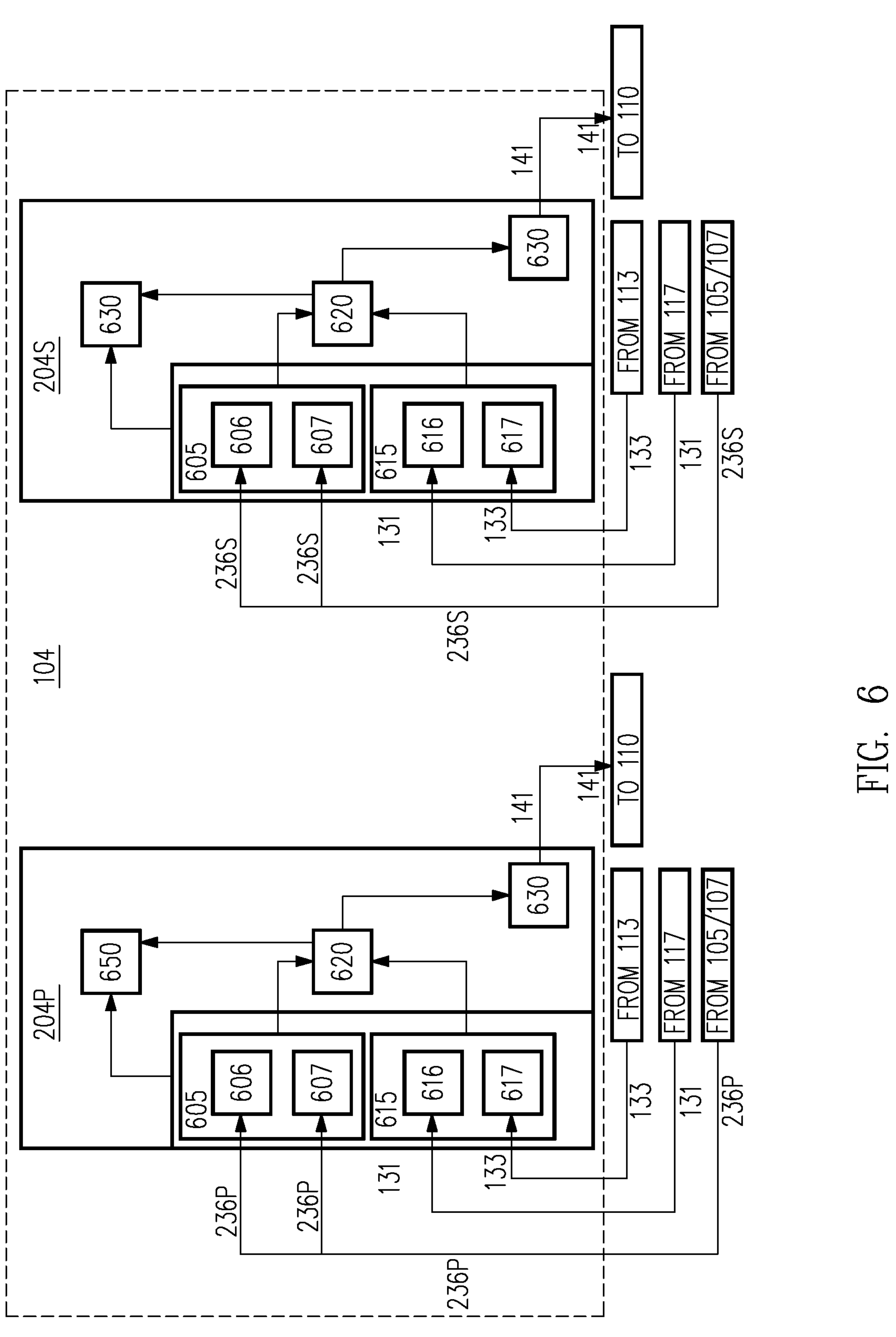
FIG. 6 is a high-level functional block diagram of processing components of one specific example of an electronics control module of one specific example of a system for pipeline testing in accordance with one embodiment.

In particular, FIG. 2 is a block diagram of a specific example of a system for pipeline testing 200 in accordance with one embodiment; FIG. 3 is a diagram of a specific example of an electronics control module 103 and automatic fluid control system 110 of one specific example of a system for pipeline testing in accordance with one embodiment; FIG. 4 is a diagram of an electronics layout of one specific example of an electronics control module 103 of one specific example of a system for pipeline testing in accordance with one embodiment; FIG. 5 is one specific example of a P and I diagram of one specific example of an automatic fluid control system 110 of one specific example of a system for pipeline testing in accordance with one embodiment; and FIG. 6 is a high-level functional block diagram of processing components of one specific example of an electronics control module of one specific example of a system for pipeline testing in accordance with one embodiment.

High Level Illustrative Solenoid/PLC System

Referring now to FIGS. 2, 3, 4, 5, and 6 together, FIG. 2 is a block diagram of a specific example of a system for pipeline testing 200 in accordance with one embodiment.

As seen in FIG. 2 in one embodiment, system for pipeline testing 200 includes test trailer 101. A picture of one embodiment of test trailer 101 is shown in FIGS. 7, 8, 9, and 10 which are discussed in more detail below.

Referring back to FIG. 2, housing the testing components discussed below in test trailer 101 has numerous advantages including, but not limited to, the ability to move system for pipeline testing 200 from job site to job site, from fabrication facility to the pipelines in the field, and from pipeline section to pipeline section as the entire pipeline is tested.

As discussed below, in various embodiments, test trailer 101 is self-sufficient and is capable of providing test data to remote locations in relative real time.

As seen in FIG. 2, in one embodiment, test trailer 101 houses electronics control module 103 (in this particular specific example an electronics control box), fluid control system 110 (in this particular specific example a manifold control box), pressure sensors 113, access panel 106, and trailer communications system 118 (in this particular specific example a satellite communications system).

As also seen in FIG. 2, in one embodiment, electronics control module 103 includes processor element 104 that, in this specific example of one embodiment, is made up of primary PLC 204P and secondary PLC 204S.

As also seen in FIG. 2, electronics control module 103 includes control parameters data input system 105 that, in this specific example of one embodiment, is a Human/Machine Interface (HMI) including a touch screen through which an operator can enter test control parameter input data (not shown).

Also shown in FIG. 2 is hub 107, Emergency Stop Device (ESD) 125, and access panel 106.

As noted, in this specific illustrative example, processor element 104 includes two Programable Logic Controllers (PLCs), PLC 204P and PLC 204S. In one embodiment, PLC 204P and PLC 204S are redundant components designed to ensure continuous operation of the testing functions.

PLC 204P and PLC 204S can be any PLC discussed herein, known in the art at the time of filing, and/or as developed/made available after the time of filing capable of being programmed to run a pipeline test, monitor data from remote sensors, and generated control signals to control a pipeline test. Consequently, a more detailed example of any particular PLC and the programming methods and operation associated with any particular PLC, is omitted here to avoid detracting from the invention.

A more detailed discussion of one specific example of PLC 204P and PLC 204S is provided below with respect to FIG. 6.

As also seen in FIG. 2, in one embodiment, system for pipeline testing 200 also includes pressure sensors 113 that receive pressure data from the section of pipe being tested 120 via hose connect 121 and sense hose 123. Pressure sensors 113 then relay pressure data to processor element 104 via pressure data line 133.

As noted, in one embodiment, control parameters data input system 105 is an HMI through which an operator can enter test control parameter input data (not shown). As discussed in more detail below, the control parameter input data includes, but is not limited to data for directing the operation of the specific desired pressure test in the desired way as well as data indicating acceptable pressure ranges, temperature ranges, test times and limits, and/or any other test parameter data and data ranges desired.

In one embodiment, the control parameter input data is provided from control parameters data input system 105 to PLC 204P and PLC 204S via hub 107 and communication lines 236P and 236S.

In one embodiment, control parameters data input system 105 is also connected to trailer communications system 118 via USB line 239, access panel 106, and communications/data line 135 which, in one embodiment, is a CAT 5 data line. In this specific illustrative example communications system 118 is a satellite communications system used to provide various data and displays to remote communications system 150, server 151 and remote display 152.

In one embodiment, control parameters data input system 105 is also connected to an external local display 238, via HDMI line 240, access panel 106, and HDMI line 237. External local display 238 can be used to monitor various test parameters from outside test trailer 101.

In one embodiment, hub 107 facilitates communications between operators and sub-systems via data/communication lines 235, 236P, 236S, as well as various off-site communications, display, and data transfer functions via communication line 235, access panel 106 and communications/data line 135, in one embodiment, a CAT 5 data line.

In one embodiment, access panel 106 receives temperature data from temperature sensors 117 via temperature data line 131 and provides this data to PLC 204P and PLC 204S via temperature data line 132. In addition, in one embodiment, access panel 106 relays communications between operators and sub-systems as well as various off-site communications, display, and data transfer functions to trailer communications system 118 via communications/data line 135.

As also noted above and seen in FIG. 2 in one embodiment, system for pipeline testing 200 also includes pressure sensors 113 that receive pressure data from the section of pipe being tested 120 via hose connect 121 and sense hose 123. Pressure sensors 113 then relay pressure data to PLCs 204P and 204S via pressure data line 133.

A more detailed discussion of one specific example of pressure sensors 113 is provided below with respect to FIG. 5.

In one embodiment, multiple sensors are used with system for pipeline testing 200 including, but not limited to, redundant pressure sensors 113, various temperature sensors 117, and/or any other remote and/or local sensors for obtaining real time sensor data for monitoring any test parameters desired.

In one embodiment, PLC 204P and PLC 204S receive sensor data from the various sensors, including pressure sensors 113 and temperature sensors 117 and then compare the sensor data to the control parameter input data from control parameters data input system 105.

As seen in FIG. 2, in one embodiment, a pressurized test medium source 116 is connected to pressure up sub-system 111 of fluid control system 110 via line 124. In various embodiments, pressurized test medium source 116 can be any source of pressurized test medium such as a water or other liquid pump, and/or a source of high-pressure gas, such as a nitrogen tank, of any other source of pressurized test medium as discussed herein, and/or as known in the art at the time of filing, and/or as developed/made available after the time of filing.

In one embodiment, fluid control system 110 receives control signals from PLC 204P and/or PLC 204S of electronics control module 103 via data lines 141P and 141S, respectively, which are referred to herein collectively as control signal data line 141.

As seen in FIG. 2, in one embodiment, fluid control system 110 includes a pressure up sub-system 111. In one embodiment, pressure up sub-system is used for automatically increasing the flow of test medium from pressurized test medium source 116 via pressure line 122 and hose connect 121, to thereby automatically increase the pressure in section of pipe to be tested 120 in response to control signals from PLC 204P and/or PLC 204S via control signal data line 141.

In this specific illustrative example, pressure up sub-system 111 is a series of pressure up solenoid-controlled valves (PU1), each of which can be individually controlled, or controlled in sets, by control signals from PLC 204P and/or PLC 204S via control signal data line 141.

As also seen in FIG. 2, and as discussed in more detail below, in one embodiment, fluid control system 110 includes and a pressure down sub-system 112 for automatically bleeding off pressure from section of pipe to be tested 120 in response to control signals from PLC 204P and/or PLC 204S on control signal data line 141 using vent line 114 and vent 115.

In this specific illustrative example, pressure down sub-system 112 is a series of bleed down solenoid-controlled valves (BD1), each of which can be individually controlled, or controlled in sets, by control signals from PLC 204P and/or PLC 204S via control signal data line 141.

FIG. 5 is a more detailed example of one embodiment of fluid control system 110, including solenoid-controlled valve pressure up sub-system 111 and solenoid-controlled pressure down sub-system 112. FIG. 5 is discussed in more detail below.

As discussed in more detail below, in various embodiments, fluid control system 110 can be any system capable of automatically increasing or decreasing pressure levels in section of pipe to be tested 120 in response to control signals from PLC 204P and/or PLC 204S.

In one embodiment, if PLC 204P and/or PLC 204S of electronics control module 103 determines that the sensor data has deviated from the limits defined in by the control parameter input data in such a way that a defined emergency condition exists, electronics control module 103 automatically generates an emergency shut down control signal via control signal data line 141 that causes the pressure down sub-system 112 of fluid control system 110 to automatically bleed off pressure from the pipe section being tested 120 via vent line 114 and vent 115 immediately.

In addition, in one embodiment, system for pipeline testing 200 includes ESD 125 that provides a manual emergency shutdown mechanism that can be manually activated to generate the emergency shut down control signal on line 126 to make pressure down sub-system 112 bleed off pressure from pipe section being tested 120 via vent line 114 and vent 115 immediately.

As seen in FIG. 2, in one embodiment, system for pipeline testing 200 includes remote communications system 150, server 151, and remote display 152. In one embodiment, remote communications system 150 receives data from trailer communications system 118 and relays the data to server 151. In one embodiment, the data is then made available to remote display 152 for viewing remotely, in relative real time.

FIG. 3 is a diagram of a specific example of an electronics control module 103 and automatic fluid control system 110 of one specific example of a system for pipeline testing in accordance with one embodiment.

Referring to FIGS. 2, 3, 4, 5, and 6 together, as seen in FIG. 3, in one embodiment, electronics control module 103 and fluid control system 110 are connected as shown.

In one embodiment, power is supplied to PLC 204P and/or PLC 204S via 120V AC breakers 301. In addition, power for operating the solenoids "S" of fluid control system 110 is selectively applied to the solenoids "S" via pressure up solenoid relays 310 and pressure down solenoid relays 320.

A more detailed diagram of electronics control module 103 is discussed below with respect to FIG. 4.

Again, referring to FIGS. 2, 3, 4, 5, and 6 together, as seen in FIG. 3, in one embodiment, fluid control system 110 includes pressure up sub-system 111 including pressure up solenoid-controlled valves and pressure down sub-system 112 including pressure down solenoid-controlled valves.

Also shown in FIG. 3 are pressure sensors 113, temperature sensors 117, section of pipe to be tested 120, and the various data and connection lines discussed above with respect to FIG. 2.

A more detailed diagram of fluid control system 110 is discussed below with respect to FIG. 5.

FIG. 4 is a diagram of an electronics layout of one specific example of an electronics control module 103 of one specific example of a system for pipeline testing 200 in accordance with one embodiment.

Referring to FIGS. 2, 3, 4, 5, and 6 together, as seen in FIG. 4, in one embodiment, power is supplied to PLC 204P and/or PLC 204S via 120V AC breakers 301. In addition, power for operating the solenoids "S" of fluid control system 110 is selectively applied to the solenoids "S" via power supplies 302 and 303, pressure up solenoid relays 310, and pressure down solenoid relays 320.

Also shown in FIG. 4 is fuse system 304 and the various data and connection lines discussed above with respect to FIG. 2.

FIG. 5 is one specific example of a P and I diagram of one specific example of an automatic fluid control system 110 of one specific example of a system for pipeline testing 200 in accordance with one embodiment.

Referring to FIGS. 2, 3, 4, 5, and 6 together, as seen in FIGS. 2 and 5, in one embodiment, fluid control system 110 includes a pressure up sub-system 111. In one embodiment, pressure up system is used for automatically increasing the flow of test medium from pressurized test medium source 116 via pressure line 122 and hose connect 121, to thereby automatically increase the pressure in section of pipe to be tested 120 in response to control signals from PLC 204P and/or PLC 204S.

In this specific illustrative example, pressure up subsystem 111 is a series of pressure up solenoid-controlled valves (PU1), each of which can be individually controlled, or controlled in sets, by control signals from PLC 204P and/or PLC 204S via control signal data line 141.

In one embodiment, each of the pressure up solenoid-controlled valves (PU1) is connected to a pressure line that includes a gate or orifice 503 of a specific, or variable, diameter. In various embodiments, the diameters of gates or orifices 503 can be of different values, or different settings, so that the pressure provided can be controlled to very specific amount via the use of not only a subset of pressure up solenoid-controlled valves (PU1), but a subset of pressure up solenoid-controlled valves (PU1) having different associated gate or orifice 503 diameters. In this way very fine increments of pressure can be added by selecting various subsets of pressure up solenoid-controlled valves (PU1).

As also seen in FIGS. 2 and 5, in one embodiment, fluid control system 110 includes and a pressure down sub-system 112 for automatically bleeding off pressure from section of pipe to be tested 120 in response to control signals from PLC 204P and/or PLC 204S on control signal data line 141 and using via vent line 114 and vent 115.

In this specific illustrative example, pressure down subsystem 112 is a series of bleed down solenoid-controlled valves (BD1), each of which can be individually controlled, or controlled in sets, by control signals from PLC 204P and/or PLC 204S via control signal data line 141.

In one embodiment, each of the bleed down solenoid-controlled valves (BD1) is connected to a pressure line that includes a gate or orifice 511 of a specific, or variable, diameter. In various embodiments, the diameters of gates or orifices 511 can be of different values, or different settings, so that the pressure released can be controlled to very specific amount via the use of not only a subset of bleed down solenoid-controlled valves (BD1), but a subset of bleed down solenoid-controlled valves (BD1) having different associated gate or orifice 511 diameters. In this way very fine increments of pressure can be bled off by selecting various subsets of bleed down solenoid-controlled valves (BD1).

Also seen in FIG. 5 is bleed by-pass valve 520. In one embodiment, bleed by-pass valve 520 is a manual by-pass valve.

Also seen in FIG. 5 is sense bleed valve 521 connected to pressure sensors 113 via line 123. In one embodiment, sense bleed valve 521 is used as a manual safety valve to accommodate freezing conditions.

Also shown in FIG. 5 is pressure sensors 113 including, in this specific example, two redundant pressure sensors 531 and 532 and analog pressure gauge 533.

Also shown in FIG. 5 are various connections and data lines discussed above with respect to FIG. 2.

FIG. 6 shows a block functional diagram of one specific illustrative example of PLCs 204P and 204S.

Referring to FIGS. 2 and 6 together, as seen in FIG. 6, in one embodiment, PLCs 204P and 204S are virtually identical PLCs that are designed to be redundant components so that if there is a failure of any kind in primary PLCs 204P, secondary PLC 204S can take over almost immediately so that the test being conducted is not interrupted.

To this end, both PLCs 204P and 204S include the same inputs, and control and input data, including, but not limited to control parameter input data 605 provided from control parameters data input system 105 via hub 107 and communication lines 236P and 236S.

Referring again to FIGS. 2 and 6 together, as seen in FIG. 6, in various embodiments, control parameter input data 605 includes, but is not limited to, test control parameter input data 606 for conducting the pressure test in the desired manner, e.g., data for directing the operation of the specific desired pressure test in the desired way, and parameters data 607 indicating acceptable pressure ranges, temperature ranges, test times and limits, and/or any other test parameter data and data ranges desired.

Referring again to FIGS. 2 and 6 together, as seen in FIG. 6, in one embodiment, both PLCs 204P and 204S include the same sensor inputs and sensor input data 615 including, but not limited to, temperature data 616 from temperature sensors 117 via temperature data line 131, and pressure data 617 from pressure sensors 113 that receive pressure data from the section of pipe being tested 120 via hose connect 121 and sense hose 123. Pressure sensors 113 then relay pressure data 617 to PLCs 204P and 204S via pressure data line 133.

Referring again to FIGS. 2 and 6 together, as seen in FIG. 6, in one embodiment, both PLCs 204P and 204S include a compare and analysis processor module 620 that receives control parameter input data 605, such as test control parameter input data 606 and parameters data 607 as well as sensor data 615, such as 616 and 617, from the various sensors, including pressure sensors 113 and temperature sensors 117. In one embodiment, compare and analysis processor module 620 then compares the sensor data 615 to the control parameter input data 605 from control parameters data input system 105.

Referring again to FIGS. 2 and 6 together, in one embodiment, if compare and analysis processor module 620 of PLC 204P and/or PLC 204S of electronics control module 103 determines that the sensor data 615 has deviated from the limits defined in by the control parameter input data 605, compare and analysis processor module 620 automatically generates control signals 630 to correct the situation by then sending the required control signals to fluid control system 110 via control signal data line 141.

In addition, referring again to FIGS. 2 and 6 together, in one embodiment, if compare and analysis processor module 620 of PLC 204P and/or PLC 204S of electronics control module 103 determines that the sensor data 615 has deviated from the limits defined in by the control parameter input data 605 in such a way that a defined emergency condition exists, compare and analysis processor module 620 automatically generates an emergency shut down control signal on control signal data line 141 that causes the pressure down subsystem 112 of fluid control system 110 to automatically bleed off pressure from the pipe section being tested 120 via vent line 114 and vent 115 immediately.

Referring again to FIGS. 2 and 6 together, in one embodiment, PLC 204P and PLC 204S also record and time stamp all test related data as test data 650.

PLC 204P and PLC 204S can be any PLC discussed herein, known in the art at the time of filing, and/or as developed/made available after the time of filing capable of being programmed to run a pipeline test, monitor data from remote sensors, and generated control signals to control a pipeline test. Consequently, a more detailed example of any particular PLC and the programming methods and operation associated with any particular PLC, is omitted here to avoid detracting from the invention.

High Level Operation of Illustrative Solenoid/PLC System

Referring again to FIGS. 2, 3, 4, and 5, in the operation of one embodiment, a section of pipe to be tested 120 is filled with a test medium, typically water or nitrogen, or any test medium as discussed herein and/or as known in the art, and/or as becomes available and/or known in the art after the time of filing. In addition, hose connect 121 is attached to the section of pipe to be tested 120.

In one embodiment, pressurized test medium source 116 is provided and connected to fluid control system 110, typically to pressure up sub-system 111 of fluid control system 110, via line 124.

In one embodiment, pressure hose 122 is also connected to control system 110, typically to pressure up sub-system 111 and pressure down sub-system 112 of fluid control system 110.

In one embodiment, the combination of pressurized test medium source 116, line 124, fluid control system 110, pressure hose 122, vent line 114, vent 115 and hose connect 121 is used to supply high pressure test medium, such as water or gas, to section of pipe to be tested 120 in order to raise the pressure inside section of pipe to be tested 120 and, when needed, to bleed off pressure via vent line 114 and vent 115 as directed by control signals from control signal data line 141 and electronics control module 103.

In one embodiment, control parameters data input system 105 is then used to enter test control parameter input data (not shown). In one embodiment, control parameters data input system 105 is a Human/Machine Interface through which an operator can enter test control parameter input data (not shown).

In one embodiment, the control parameter input data includes, but is not limited to data indicating acceptable pressure ranges, temperature ranges, test times and limits, and/or any other test parameter data and data ranges desired.

In addition, in one embodiment, control parameter input data includes test operations data indicating test operational control data such as test length, test pressures, pressure ramp up and ramp down controls, wait time controls and various other data used to control and conduct the desired pressure test in the desired manner.

In one embodiment, control parameter input data is relayed to PLC 204P and/or PLC 204S via hub 107 and data lines 236P and 236S. In one embodiment, PLC 204P and/or PLC 204S are redundant components designed to ensure continuous operation of the testing functions.

In one embodiment, multiple sensors are provided and placed as needed. In one embodiment, the sensors are remote sensors including, but not limited to redundant pressure sensors 113, various temperature sensors 117, and/or any other remote and/or local sensors for obtaining real time sensor data for monitoring any test parameters desired.

In one embodiment, under the direction of the control parameter input data and electronics control module 103 a pressure test is begun. As the test is begun, electronics control module 103 automatically generates various control signals that are sent to fluid control system 110 via control signal data line 141, to begin adding pressure to section of pipe to be tested 120 via pressurized test medium source 116, line 124, fluid control system 110, and pressure hose 122.

In one embodiment, as the test is run, PLC 204P and/or PLC 204S of electronics control module 103 is used to monitor data from remote sensors, including pressure sensors 113 and temperature sensors 117, and compare the remote sensor data to control parameter input data from control parameters data input system 105 that includes data indicating acceptable testing parameter ranges while it automatically runs the test in accordance with the test operation data of the control parameter input data.

In one embodiment, in response to the comparison of the real time sensor data and the control parameter input data, the electronics control module 103 automatically generates various control signals that are sent to fluid control system 110 via control signal data line 141. In response to the control signals from control signal data line 141, the pressure up solenoid activated valves (PU1) of pressure up sub-system 111 or solenoid activated bleed down valves (BD1) of pressure down sub-system 112 of fluid control system 110 are automatically selectively activated to regulate the pressure in the pipeline section being tested 120 and, if necessary, instigate an emergency shutdown of the test and to release all pressure from the pipeline section being tested. In one embodiment, all test data is recorded, stored, and made available as needed/desired by electronics control module 103 and/or PLC 204P and/or PLC 204S.

In one embodiment, when electronics control module 103 determines that the sensor data has deviated from the limits defined by the control parameter input data, electronics control module 103 automatically sends the appropriate control signal to the fluid control system 110 via control signal data line 141 to ensure the situation is rectified quickly and automatically so the test remains safe and accurate.

In one embodiment, if electronics control module 103 determines that the sensor data has deviated from the limits defined in by the control parameter input data in such a way that a defined emergency condition exists, electronics control module 103 automatically generates an emergency shut down control signal on control signal data line 141 that causes the bleed down solenoid activated valves of pressure down sub-system 112 to bleed off pressure from the pipe section being tested 120 via vent line 114 and vent 115, to immediately shut down the test.

As noted above, in one embodiment, there is also a manual Emergency Shutdown Device 125 (ESD 125) that can be manually activated to generate the emergency shut down control signal on data line 126 to make the pressure down sub-system 112 bleed off pressure from the pipe section being tested 120 immediately via vent line 114 and vent 115.

As discussed in more detail below, in one embodiment, electronics control module 103 also time stamps and records all the sensor data in real-time and maintains a record of all sensor data, actions taken, and test parameters throughout the entire test.

In one embodiment, the disclosed method and system for pipeline testing includes one or more integrated communications lines 236, 237, and 235 to connect workers with each other and the system components via hub 107.

As seen in FIG. 2, in one embodiment, system for pipeline testing 200 includes remote communications system 150, server 151, and remote display 152. In one embodiment, remote communications system 150 receives data from trailer communications system 118 and relays the data to server 151. In one embodiment, the data is then made available to remote display 152 for viewing remotely, in relative real time.

In one embodiment, the disclosed method and system for pipeline testing uses a mobile testing trailer 101 to house the various test components disclosed herein.

Figure 7:
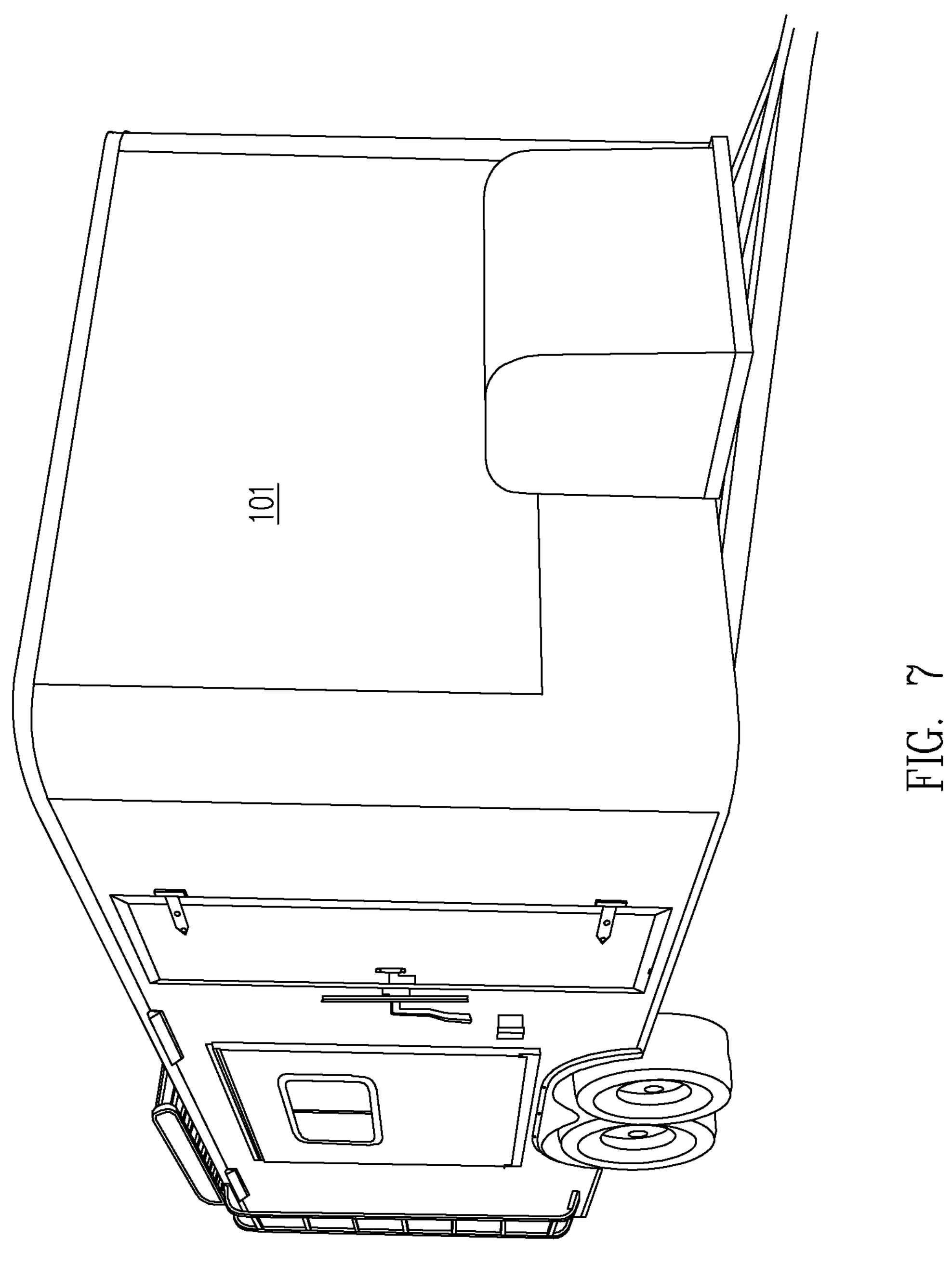
FIG. 7 is a photograph of one specific example of a pipeline testing trailer in accordance with one embodiment.

FIG. 7 is a photograph of one specific example of a testing trailer 101 in accordance with one embodiment used to house the various test components disclosed herein.

Figure 8:
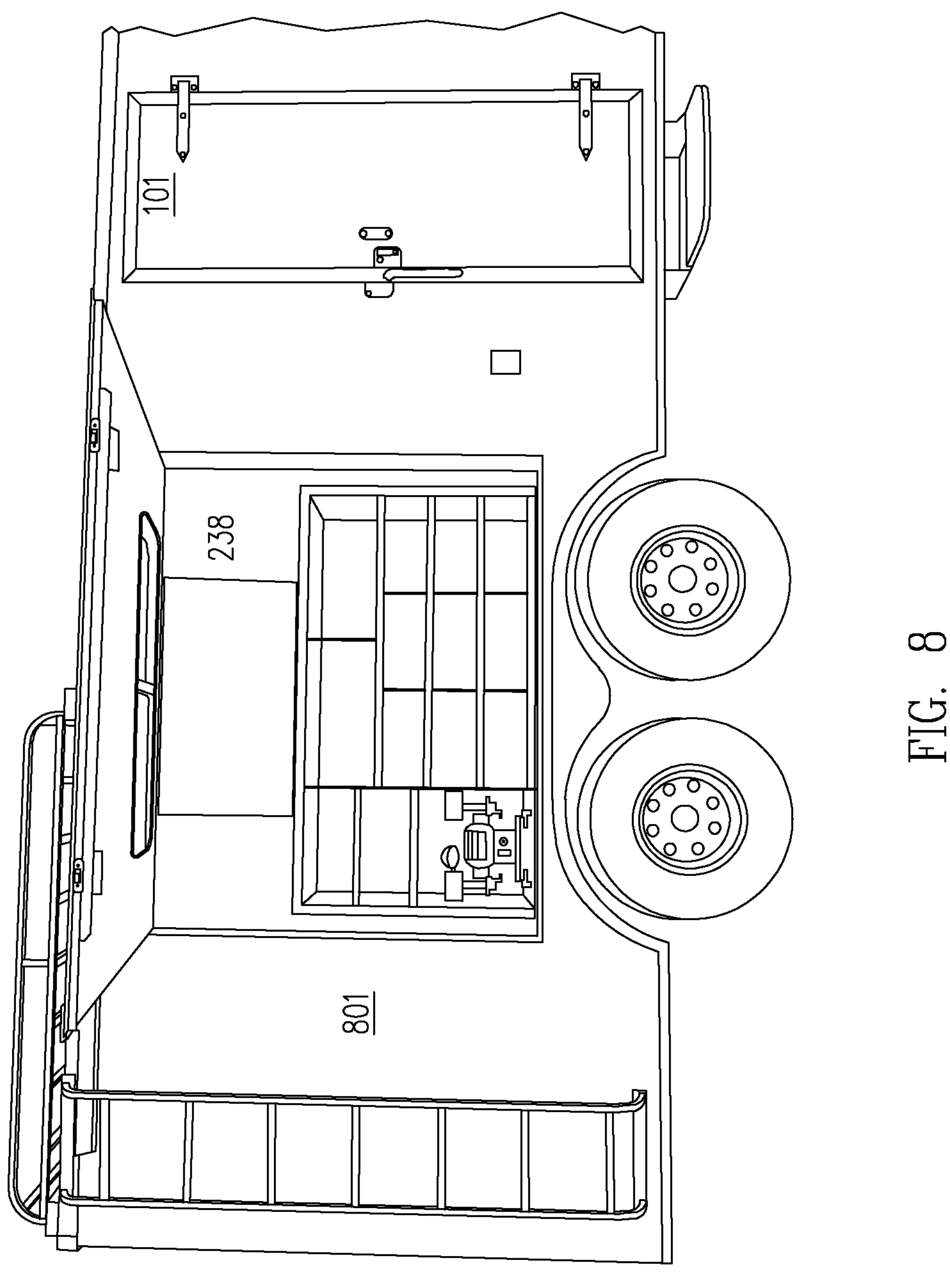
FIG. 8 is a photograph of one specific example of a pipeline testing trailer exterior including an external monitor in accordance with one embodiment.

FIG. 8 is a photograph of one specific example of the testing trailer 101 of FIG. 7 showing exterior right side 801 including an external local display 238 in accordance with one embodiment.

Figure 9:
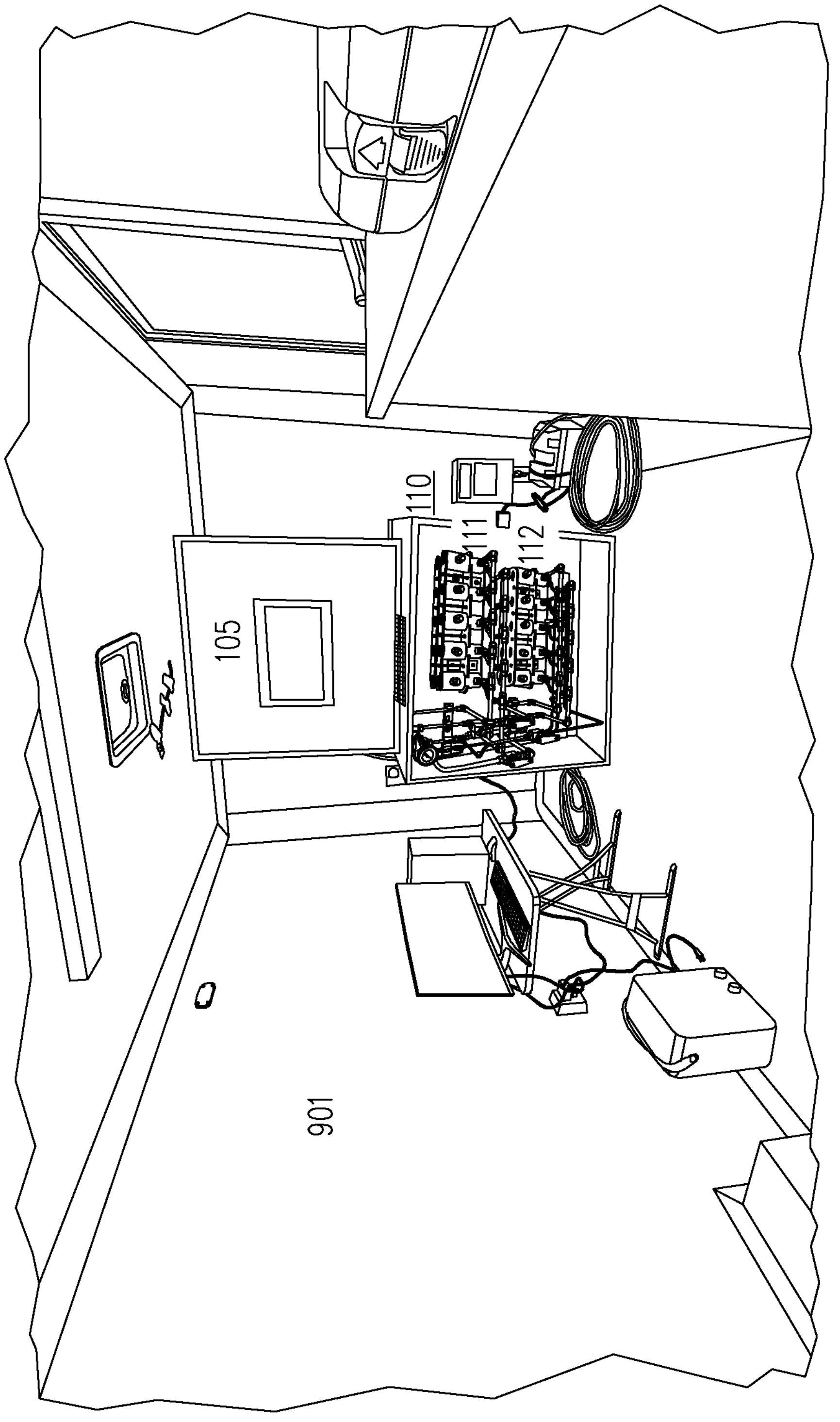
FIG. 9 is a photograph of one specific example of a pipeline testing trailer interior including control parameter input display/station and a remote fluid control system in accordance with one embodiment.

FIG. 9 is a photograph of one specific example of the testing trailer 101 of FIG. 7 showing interior 901 including control parameters data input system 105 and fluid control system 110, including pressure up sub-system 111 and pressure down sub-system 112 in accordance with one embodiment.

Figure 10:
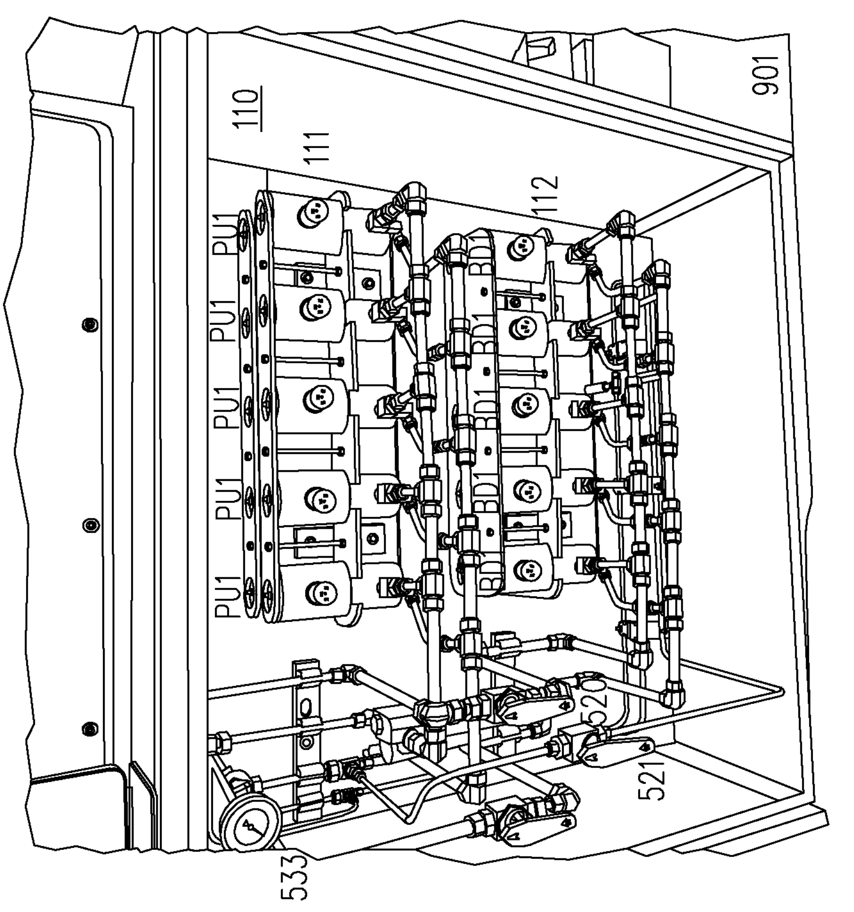
FIG. 10 is a photograph of one specific example of a pipeline testing trailer interior including a remote fluid control system in accordance with one embodiment.

FIG. 10 is a photograph of one specific example of the testing trailer 101 of FIG. 7 showing interior 901 including fluid control system 110, including pressure up sub-system 111 and pressure down sub-system 112 in accordance with one embodiment. Referring to FIGS. 2, 5, and 10 together, as seen in FIG. 10 are pressure up solenoid operated valves PU1, bleed down solenoid operated valves BD1, bleed by-pass valve 520, sense bleed valve 521, and analog pressure gauge 533 in accordance with one embodiment The disclosed system for pipeline testing 200 addresses and mitigates or negates the issues associated with prior art pipeline testing methods and systems.

In particular, system for pipeline testing 200 eliminates the need for workers at various manual monitoring stations and valve operation stations by incorporating an automated fluid control system and remote sensors for collecting sensor data. In this way, using system for pipeline testing 200, monitoring is performed by electronic sensors and the pipe pressure is automatically and remotely controlled in response to the control signals from the electronics control module, all without the need for human action/intervention. Consequently, fewer workers are required and those workers do not need to be stationed at various manual monitoring and valve stations, or near the pipeline section being tested. This represents a significant safety advantage and largely eliminates the time delays encountered using prior art systems.

In addition, by incorporating an electronics control module, an automated fluid control system, and remote electronic sensors, system for pipeline testing 200 largely eliminates the potential for human error, as well as the delays in test system parameter monitoring, long reaction times, and inaccurate recording of information associated with prior art systems.

In addition, by incorporating an electronics control module, an automated fluid control system, and remote electronic sensors, system for pipeline testing 200 minimizes the prior art reliance on often unreliable, inaccurate, and time-consuming mechanical safety devices and the need to replace many of these components after they have been activated.

In addition, as discussed above, and in more detail below, in contrast to the prior art, one embodiment of system for pipeline testing 200 provides redundant safety override systems including both an automatic and manual safety override/shutdown mechanism.

In addition, as discussed above, and in more detail below, in contrast to the prior art, system for pipeline testing 200 provides backup systems and/or redundancy of components.

In addition, as discussed above, and in more detail below, in contrast to the prior art, system for pipeline testing 200 provides a real time remote monitoring capability for clients and an integrated communications system to minimize the communication delays associated with prior art systems.

In addition, as discussed above, and in more detail below, in contrast to the prior art, system for pipeline testing 200 provides a data recording mechanism that is not subject to human error and/or human manipulation and provides a systematic and efficient mechanism for creating standardized test data and storing that data securely.

For these and many other reasons discussed herein, system for pipeline testing 200 solves the long standing and on-going technical problem of safely, accurately, effectively, and efficiently testing pipelines that also protects the public, workers, equipment being tested, and materials being transported by minimizing delays, opportunities for human error, and the reliance on manual safety devices.

Method of Operation of One Illustrative Embodiment

Figure 11:
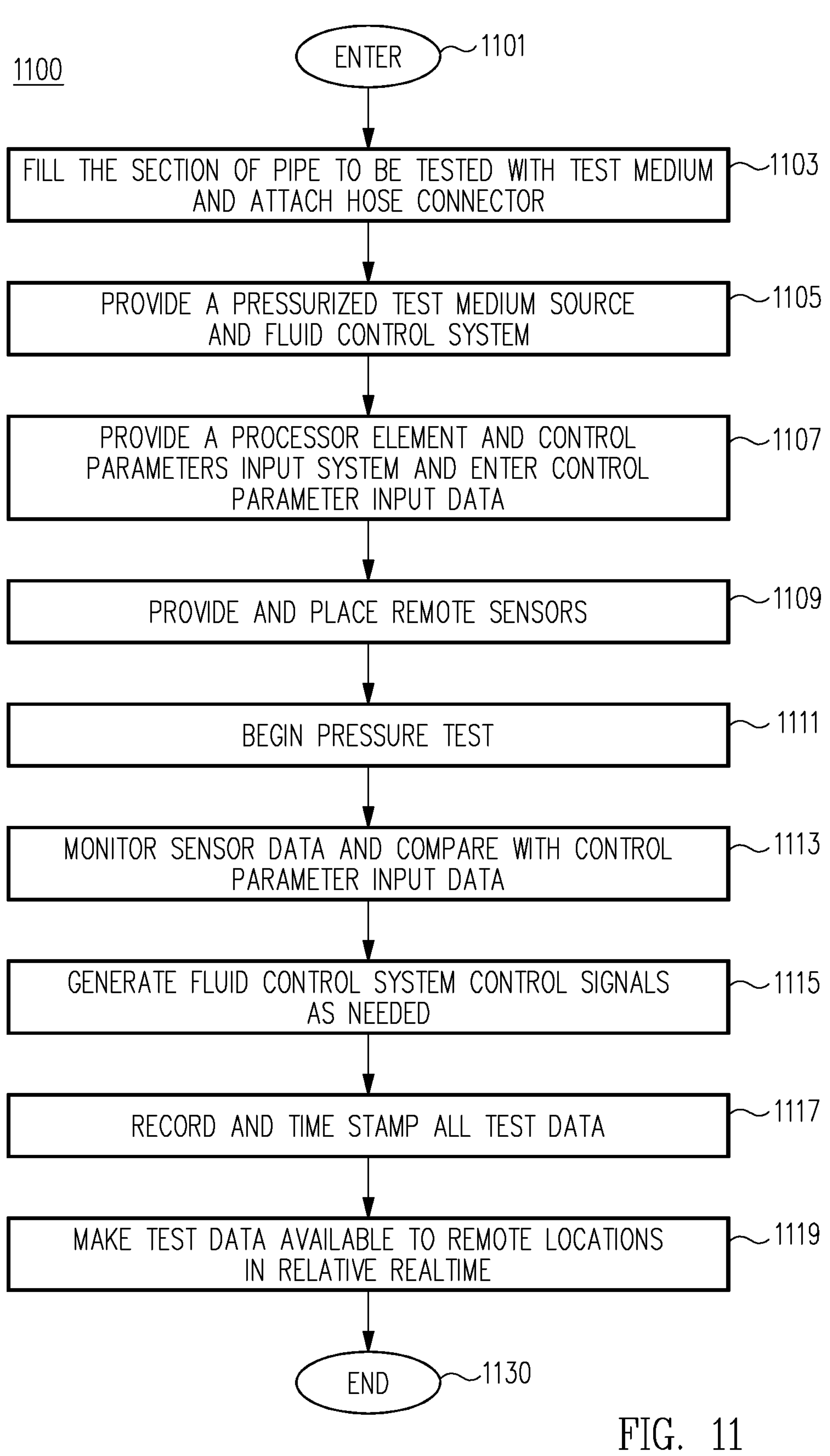
FIG. 11 is a flow chart of one specific example of a method for pressure testing pipelines in accordance with one embodiment.

FIG. 11 is a flow chart of one specific example of a method for pressure testing pipelines 1100 in accordance with one embodiment.

Referring to FIGS. 1 and 11 together, method for pressure testing pipelines 1100 begins at enter operation 1101 and process flow proceeds to 1103.

In one embodiment at 1103 a section of pipe to be tested is filled with a test medium, typically water or nitrogen gas, or any test medium as discussed herein and/or as known in the art, and/or as becomes available and/or known in the art after the time of filing. and a hose connect is attached to the section of pipe to be tested.

As a specific example, and as shown in FIG. 1, in one embodiment at 1103 a section of pipe to be tested 120 is filled with a fluid, typically water, and hose connect 121 is attached to the section of pipe to be tested 120.

In one embodiment, once the section of pipe to be tested is filled with a fluid and a hose connect is attached to the section of pipe to be tested at 1103, process flow proceeds to 1105.

In one embodiment, at 1105, a pressurized fluid source and fluid control system are provided and connected.

As a specific example, and as shown in FIG. 1, in one embodiment, at 1105, a pressurized fluid source 116 and fluid control system 110 are provided and connected. In one embodiment, pressurized fluid source 116 is provided and connected to fluid control system 110, typically to pressure up sub-system 111 of fluid control system 110, via line 124. In one embodiment, pressure hose 122 is also connected to fluid control system 110, typically to pressure up sub-system 111 and pressure down sub-system 112 of fluid control system 110.

In one embodiment, the combination of pressurized fluid source 116, line 124, fluid control system 110, pressure hose 122, vent line 114, vent 115 and hose connect 121 is used to supply high pressure test medium, such as water or gas to section of pipe to be tested 120 in order to raise the pressure inside section of pipe to be tested 120 and, when needed, to bleed off pressure via vent line 114 and vent 115 as directed by control signals on control signal data line 141 from electronics control module 103.

In one embodiment, once a pressurized fluid source and fluid control system are provided and connected at 1105, process flow proceeds to 1107.

In one embodiment, at 1107, a processor element and control parameters data input system are provided and test control parameter input data is entered using the provided control parameters data input system.

As a specific example, and as shown in FIG. 1, in one embodiment at 1107, control parameters data input system 105 is used to enter test control parameter input data (not shown). In one embodiment, control parameters data input system 105 is an HMI through which an operator can enter test control parameter input data (not shown).

In one embodiment, the control parameter input data includes, but is not limited to data indicating acceptable pressure ranges, temperature ranges, test times and limits, and/or any other test parameter data and data ranges desired.

In addition, in one embodiment, control parameter input data includes test operations data indicating test operational control data such as test length, test pressures, pressure ramp up and ramp down controls, wait time controls and various other data used to control and conduct the desired pressure test in the desired manner.

In one embodiment, control parameter input data is relayed to processor element 104 via hub 107 and data line 236. As noted above, In one embodiment, processor element 104 includes one or more processors (not shown) such as, but not limited to, Programable Logic Controllers (PLCs). In one embodiment, the one or more processing components are redundant components designed to ensure continuous operation of the testing functions.

In one embodiment, once a processor element and control parameters data input system are provided and test control parameter input data is entered using the provided control parameters data input system at 1107, process flow proceeds to 1109.

In one embodiment, at 1109, multiple sensors are provided and placed as needed.

In various embodiments, the sensors provided at 1109 are remote sensors and can include, but are not limited to, calibrated pressure transmitters/data loggers to record and report test pressure data and calibrated temperature transmitters/data loggers to record and report test temperature data such as pipe temperature, ground temperature, and/or ambient air temperature.

As a specific example, and as shown in FIG. 1, in one embodiment, the multiple sensors provided and placed as needed are remote sensors including, but not limited to redundant pressure sensors 113, various temperature sensors 117, and/or any other remote and/or local sensors for obtaining real time sensor data for monitoring any test parameters desired.

In one embodiment, once multiple sensors are provided and placed as needed, at 1109, process flow proceeds to 1111.

In one embodiment, at 1111 under the direction of the control parameter input data and the processor element a pressure test is begun.

As a specific example, and as shown in FIG. 1 in one embodiment, under the direction of the control parameter input data and electronics control module 103 a pressure test is begun. As the test is begun, electronics control module 103 generates various control signals that are sent to fluid control system 110 via control signal data line 141, to begin adding pressure to section of pipe to be tested 120 via pressurized fluid source 116, line 124, fluid control system 110, and pressure hose 122.

In one embodiment, the electronics control module 103, begins a pressurization and hold cycle in which the electronics control module 103 adds pressure to the section of pipe 120 to be tested using the pressure up sub-system 111.

In one embodiment, electronics control module 103 limits how quickly pressure in the section of pipe to be tested 120 may increase utilizing the pressure sensors 113, in one embodiment, calibrated pressure transmitters, to monitor the rate of pressure increase. If the rate of pressure increase is too low, electronics control module 103 increases the rate at which pressure is added and if the increase is too fast, electronics control module 103 increases the rate at which pressure is added.

In one embodiment, once, under the direction of the control parameter input data and the processor element a pressure test is begun at 1111, process flow proceeds to 1113.

In one embodiment, at 1113, as the test is run, the processor element monitors sensor data from the remote sensors and compares the remote sensor data to control parameter input data.

As a specific illustrative example, and as discussed above with respect to FIG. 1, in one embodiment, at 1113, as the test is run processor element 104 of electronics control module 103 is used to monitor data from remote sensors, including pressure sensors 113 and temperature sensors 117, and compare the remote sensor data to control parameter input data from control parameters data input system 105 that includes data indicating acceptable testing parameter ranges while it runs the test in accordance with the test operation data of the control parameter input data.

In one embodiment, once, as the test is run, the processor element is monitoring sensor data from the remote sensors and comparing the remote sensor data to control parameter input data at 1113, process flow proceeds to 1115.

In one embodiment, at 1115, the electronics control module generates various control signals as needed that are sent to fluid control system.

In one embodiment, at 1115, in response to the comparison of the real time sensor data and the control parameter input data, the electronics control module generates various control signals that are sent to fluid control system via a control signal data line.

As a specific illustrative example, and as discussed above with respect to FIG. 1, in one embodiment, in response to the comparison of the real time sensor data and the control parameter input data, the electronics control module 103 generates various control signals that are sent to fluid control system 110 via control signal data line 141. In response to the control signals from control signal data line 141, pressure up sub-system 111 or pressure down sub-system 112 of fluid control system 110 are selectively activated to regulate the pressure in the pipeline section being tested 120 and, if necessary, instigate an emergency shutdown of the test and to release all pressure from the pipeline section being tested. In one embodiment, all test data is recorded, stored, and made available as needed/desired by electronics control module 103.

In one embodiment, when electronics control module 103 determines that the sensor data has deviated from the limits defined by the control parameter input data, electronics control module 103 automatically sends the appropriate control signal to the fluid control system 110, via control signal data line 141, to ensure the situation is rectified and the test remains safe and accurate.

In one embodiment, if electronics control module 103 determines that the sensor data has deviated from the limits defined in by the control parameter input data in such a way that a defined emergency condition exists, electronics control module 103 automatically generates an emergency shut down control signal on control signal data line 141 that causes pressure down sub-system 112 to automatically bleed off pressure from the pipe section being tested 120 via vent line 114 and vent 115, and immediately shut down the test.

As noted above, in one embodiment, there is also a manual Emergency Shutdown Device 125 that can be manually activated to generate the emergency shut down control signal on data line 126 to make the pressure down sub-system 112 bleed off pressure from the pipe section being tested 120 immediately via vent line 114 and vent 115.

In one embodiment, once in response to the comparison of the real time sensor data and the control parameter input data, the electronics control module generates various control signals that are sent to fluid control system via a control signal data line at 1115, process flow proceeds to 1117.

In one embodiment, at 1117 electronics control module time stamps and records all the sensor data in real-time and maintains a record of all sensor data, actions taken, and test parameters throughout the entire test and this data is made available as needed.

In one embodiment, electronics control module time stamps and records all the sensor data in real-time and maintains a record of all sensor data, actions taken, and test parameters throughout the entire test and this data is made available as needed. At 1117, process flow proceeds to 1119.

In one embodiment, at 1119, the test data is made available to one or more remote locations in relative real time.

As a specific illustrative example, and as discussed above with respect to FIG. 1, in one embodiment, the disclosed method and system for pipeline testing includes one or more integrated communications lines 236, 237, and 235 to connect workers with each other as well as to connect the various system 100 components via hub 107.

As noted above, in one embodiment, system for pipeline testing 100 includes remote communications system 150, server 151, and remote display 152. In one embodiment, remote communications system 150 receives data from trailer communications system 118 and relays the data to server 151. In one embodiment, trailer communications system 118 and remote communications system 150 are connected by satellite, cell towers, and/or any other wireless communications system. In one embodiment, the data is then made available to remote display 152 for viewing remotely, in relative real time.

In one embodiment, once the test data is made available to one or more remote locations in relative real time at 1119, the test is completed and method for pressure testing pipelines 1100 is ended at 1130 to await the next test.

The disclosed method for pipeline testing 1100 addresses and mitigates or negates the issues associated with prior art pipeline testing methods and systems.

In particular, method for pipeline testing 1100 eliminates the need for workers at various manual monitoring stations and valve operation stations by incorporating an automated fluid control system and remote sensors for collecting sensor data. In this way, using method for pipeline testing 1100, monitoring is performed by electronic sensors and the pipe pressure is automatically and remotely controlled in response to the control signals from the electronics control module, all without the need for human action/intervention. Consequently, fewer workers are required and those workers do not need to be stationed at various manual monitoring and valve stations, or near the pipeline section being tested. This represents a significant safety advantage and largely eliminates the time delays encountered using prior art systems.

In addition, by incorporating an electronics control module, an automated fluid control system, and remote electronic sensors, method for pipeline testing 1100 largely eliminates the potential for human error, as well as the delays in test system parameter monitoring, long reaction times, and inaccurate recording of information associated with prior art systems.

In addition, by incorporating an electronics control module, an automated fluid control system, and remote electronic sensors, method for pipeline testing 1100 minimizes the prior art reliance on often unreliable, inaccurate, and time-consuming mechanical safety devices and the need to replace many of these components after they have been activated.

In addition, as discussed above, and in more detail below, in contrast to the prior art, one embodiment of method for pipeline testing 1100 provides redundant safety override systems including both an automatic and manual safety override/shutdown mechanism.

In addition, as discussed above, and in more detail below, in contrast to the prior art, method for pipeline testing 1100 provides backup systems and/or redundancy of components.

In addition, as discussed above, and in more detail below, in contrast to the prior art, method for pipeline testing 1100 provides a real time remote monitoring capability for clients and an integrated communications system to minimize the communication delays associated with prior art systems.

In addition, as discussed above, and in more detail below, in contrast to the prior art, method for pipeline testing 1100 provides a data recording mechanism that is not subject to human error and/or human manipulation and provides a systematic and efficient mechanism for creating standardized test data and storing that data securely.

For these and many other reasons discussed herein, method for pipeline testing 1100 solves the long standing and on-going technical problem of safely, accurately, effectively, and efficiently testing pipelines that also protects the public, workers, equipment being tested, and materials being transported by minimizing delays, opportunities for human error, and the reliance on manual safety devices.

Method of Operation of Solenoid Operated Valve Embodiments

Figure 12:
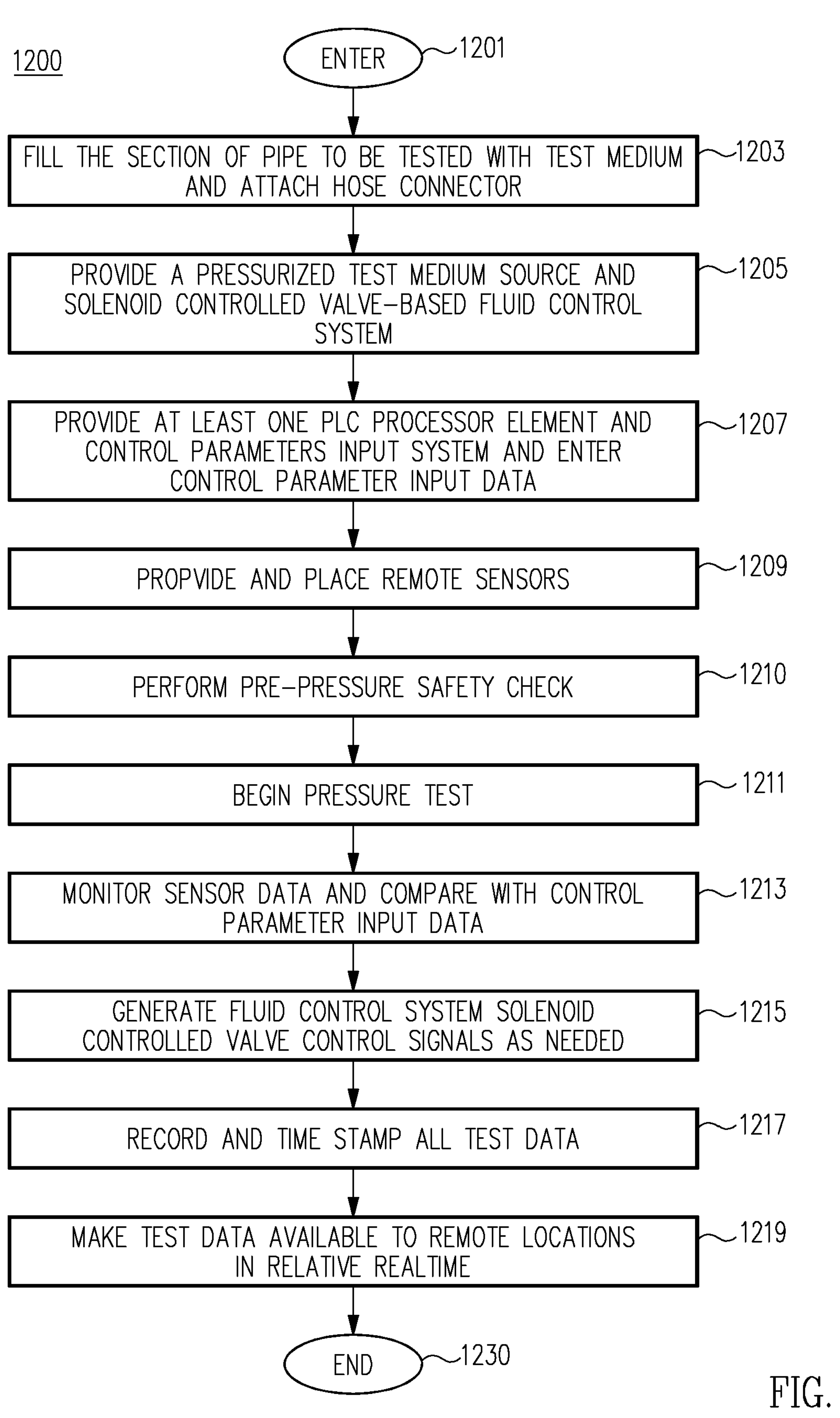
FIG. 12 is a flow chart of one specific example of a method for pressure testing pipelines in accordance with one embodiment.

FIG. 12 is a flow chart of one specific example of a method for pressure testing pipelines 1200 in accordance with one embodiment.

Referring to FIGS. 2, 3, 4, 5, 6, and 12 together, method for pressure testing pipelines 1200 begins at enter operation 1201 and process flow proceeds to operation 1203.

In one embodiment, at 1203 a section of pipe to be tested is filled with a test medium, typically water or nitrogen gas, or any test medium as discussed herein and/or as known in the art, and/or as becomes available and/or known in the art after the time of filing. and a hose connect is attached to the section of pipe to be tested.

As a specific example, and as shown in FIG. 2, in one embodiment at 1203 a section of pipe to be tested 120 is filled with a test medium, and hose connect 121 is attached to the section of pipe to be tested 120.

In one embodiment, once the section of pipe to be tested is filled with a test medium and a hose connect is attached to the section of pipe to be tested at 1203, process flow proceeds to 1205.

In one embodiment, at 1205, a pressurized test medium source and fluid control system are provided and connected.

As a specific example, and as discussed with respect to FIGS. 2 and 5, a pressurized test medium source 116 is provided and connected to fluid control system 110, typically to pressure up sub-system 111 of fluid control system 110, via line 124.

In the specific example of one embodiment of FIGS. 2 and 5, fluid control system 110 includes a pressure up sub-system 111. In one embodiment, pressure up system is used for automatically increasing the flow of test medium from pressurized fluid source 116 via pressure line 122 and hose connect 121, to thereby automatically increase the pressure in section of pipe to be tested 120 in response to control signals from PLC 204P and/or PLC 204S.

In this specific illustrative example, pressure up sub-system 111 is a series of pressure up solenoid-controlled valves (PU1), each of which can be individually controlled, or controlled in sets, by control signals from PLC 204P and/or PLC 204S via control signal data line 141.

As also seen in FIGS. 2 and 5, in one embodiment, fluid control system 110 includes and a pressure down sub-system 112 for automatically bleeding off pressure from section of pipe to be tested 120 in response to control signals from PLC 204P and/or PLC 204S on control signal data line 141 and using via vent line 114 and vent 115.

In this specific illustrative example, pressure down sub-system 112 is a series of bleed down solenoid-controlled valves (BD1), each of which can be individually controlled, or controlled in sets, by control signals from PLC 204P and/or PLC 204S via control signal data line 141.

In addition, at 1205, in one embodiment, pressure hose 122 is also connected to control system 110, typically to pressure up sub-system 111 and pressure down sub-system 112 of fluid control system 110.

In one embodiment, the combination of pressurized test medium source 116, line 124, fluid control system 110, pressure hose 122, vent line 114, vent 115 and hose connect 121 is used to supply high pressure test medium, such as water or gas, to section of pipe to be tested 120 in order to raise the pressure inside section of pipe to be tested 120 and, when needed, to bleed off pressure via vent line 114 and vent 115 as directed by control signals from control signal data line 141 and electronics control module 103.

In one embodiment, once a pressurized test medium source and fluid control system are provided and connected at 1205, process flow proceeds to 1207.

In one embodiment, at 1207, a processor element, including one or more PLCs, and control parameters data input system are provided and test control parameter input data is entered using the provided control parameters data input system.

As a specific example, and as shown in FIGS. 2 and 4, in one embodiment at 1207, control parameters data input system 105 is used to enter test control parameter input data (not shown). In one embodiment, control parameters data input system 105 is a Human/Machine Interface (HMI) through which an operator can enter test control parameter input data.

In one embodiment, the control parameter input data includes, but is not limited to data indicating acceptable pressure ranges, temperature ranges, test times and limits, and/or any other test parameter data and data ranges desired.

In addition, in one embodiment, control parameter input data includes test operations data indicating test operational control data such as test length, test pressures, pressure ramp up and ramp down controls, wait time controls and various other data used to control and conduct the desired pressure test in the desired manner.

In one embodiment, control parameter input data is relayed to processor element 104 via hub 107 and data lines 236P and 236S. In this specific illustrative example, processor element 104 includes two Programable Logic Controllers (PLCs), PLC 204P and PLC 204S. In one embodiment, PLC 204P and PLC 204S are redundant components designed to ensure continuous operation of the testing functions.

PLC 204P and PLC 204S can be any PLC discussed herein, known in the art at the time of filing, and/or as developed/made available after the time of filing capable of being programmed to run a pipeline test, monitor data from remote sensors, and generated control signals to control a pipeline test. Consequently, a more detailed example of any particular PLC and the programming methods and operation associated with any particular PLC, is omitted here to avoid detracting from the invention.

Referring to FIGS. 2 and 6, in one embodiment, at 1207 control parameters data input system 105 is used to enter control parameter input data 605 including test control parameter input data 606 for conducting the pressure test in the desired manner, e.g., data for directing the operation of the specific desired pressure test in the desired way. In one embodiment, test control parameter input data 606 includes various test control data such as test length, test pressures, pressure ramp up and ramp down controls, wait time controls and various other data used to control and conduct the desired pressure test in the desired manner.

Referring to FIGS. 2 and 6, in one embodiment, at 1207, control parameters data input system 105 is used to enter control parameter input data 605 including parameters data 607 indicating acceptable pressure ranges, temperature ranges, test times and limits, and/or any other test parameter data and data ranges desired.

In one embodiment, control parameter input data is relayed to PLC 204P and/or PLC 204S via hub 107 and data lines 236P and 236S. In one embodiment, PLC 204P and/or PLC 204S are redundant components designed to ensure continuous operation of the testing functions.

In one embodiment, once a processor element, processor element including one or more PLCs and a control parameters data input system are provided and test control parameter input data is entered using the provided control parameters data input system at 1207, process flow proceeds to 1209.

In one embodiment, at 1209, multiple sensors are provided and placed as needed.

In various embodiments, the sensors provided at 1209 are remote sensors and can include, but are not limited to, calibrated pressure transmitters/data loggers to record and report test pressure data and calibrated temperature transmitters/data loggers to record and report test temperature data such as pipe temperature, ground temperature, and/or ambient air temperature.

As a specific example, and as shown in FIG. 2, in one embodiment, the multiple sensors provided and placed as needed are remote sensors including, but not limited to redundant pressure sensors 113, various temperature sensors 117, and/or any other remote and/or local sensors for obtaining real time sensor data for monitoring any test parameters desired.

In one embodiment, once multiple sensors are provided and placed as needed, at 1209, process flow proceeds to 1210.

In one embodiment, at 1210 a pre-pressurizing safety check is begun.

In one embodiment, at 1210, when a test is ready to begin the Test Technician goes through an on-line "Pre-Pressurizing Safety Checklist" at the HMI. The Client, or their on-site Test Inspector, reviews the "Pre-Pressurizing Safety Checklist" and, if approved, one or more pressure tests are initiated.

In one embodiment, at 1210, several pressure increases and holds may occur up until the target test pressure is reached. Once the target test pressure is reached, a stabilization period begins. The Test Technician initiates the stabilization period at control parameters data input system 105. During the stabilization period pressures and temperatures for the section of pipe to be tested 120 are monitored by the PLC 204P and/or PLC 204S of electronics control module 103 and displayed continuously via on control parameters data input system 105, external local display 238, or remotely at remote display 152.

In one embodiment, after one hour (minimum), and once the temperatures and pressures are stable, PLC 204P and/or PLC 204S of electronics control module 103 will alert the Test Technician at control parameters data input system 105 that the test is ready to begin.

In one embodiment, once a pre-pressurizing safety check is performed and test operation is approved at 1210, process flow proceeds to 1211.

In one embodiment, at the completion of the stabilization period, and with the approval of the Client's on-site Test Inspector, the Pressure Test begins with the Test Technician selecting "Start Test" at control parameters data input system 105. Then at 1211, under the direction of the control parameter input data and the processor element, a pressure test is begun.

As a specific example, and as discussed with respect to FIG. 2, in one embodiment, under the direction of the control parameter input data and PLC 204P and/or PLC 204S of electronics control module 103 a pressure test is begun. As the test is begun, PLC 204P and/or PLC 204S of electronics control module 103 generates various control signals that are sent to fluid control system 110 via control signal data line 141, to begin adding pressure to section of pipe to be tested 120 via pressurized test medium source 116, line 124, fluid control system 110, and pressure hose 122.

In one embodiment, PLC 204P and/or PLC 204S of electronics control module 103 begins a pressurization and hold cycle in which PLC 204P and/or PLC 204S of electronics control module 103 adds pressure to the section of pipe 120 to be tested using the pressure up sub-system 111.

In one embodiment, PLC 204P and/or PLC 204S of electronics control module 103 limits how quickly pressure in the section of pipe to be tested 120 may increase utilizing the pressure sensors 113, in one embodiment, calibrated pressure transmitters, to monitor the rate of pressure increase. If the rate of pressure increase is too low, electronics control module 103 increases the rate at which pressure is added and if the increase is too fast, PLC 204P and/or PLC 204S of electronics control module 103 increases the rate at which pressure is added.

In one embodiment, PLC 204P and/or PLC 204S of electronics control module 103 begins a pressurization and hold cycle in which PLC 204P and/or PLC 204S of electronics control module 103 adds pressure to the section of pipe to be tested by sequentially commanding open solenoid actuated valves on the pressure up sub-system 111.

In one embodiment, once a hold pressure is reached, PLC 204P and/or PLC 204S of electronics control module 103 commands all valves pressure up sub-system 111 to be closed via a control signal on control signal data line 141. Typically, at a pressure hold, all valves of pressure up sub-system 111 are be closed shut for 15 minutes to complete a visual leak inspection while also observing pressure and temperature data for the section of pipe 120 to be tested, as displayed on control parameters data input system 105, external local display 238, or remotely at remote display 152.

In one embodiment, once, under the direction of the control parameter input data and the processor element, a pressure test is begun at 1211, process flow proceeds to 1213.

In one embodiment, at 1213, as the test is run, one or more PLCs of the electronics control module monitors sensor data from the remote sensors and compares the remote sensor data to control parameter input data.

In one embodiment, during the entirety of the pressure test one or more PLCs of the electronics control module continuously capture all test data from the temperature and pressure transmitters, actuates the solenoids on the fluid control system as needed to adjust the test pressure, records all events that occur during the test (solenoid valve actuations, for example), and sends all information for display on the control parameters data input system, an external local display, or remotely at a remote display.

As a specific illustrative example, and as discussed above with respect to FIGS. 2 and 6, in one embodiment, at 1213, as the test is run PLC 204P and/or PLC 204S of electronics control module 103 is used to monitor data from remote sensors 615, including pressure sensors 113 data 617 and temperature sensors 117 data 616, and compare the remote sensor data 615 to control parameter input data 605 from control parameters data input system 105 that includes data indicating acceptable testing parameter ranges 607 while it runs the test in accordance with the test operation data of the control parameter input data 606.

In one embodiment, once, as the test is run, one or more PLCs of electronics control module 103 are monitoring sensor data from the remote sensors and comparing the remote sensor data to control parameter input data at 1213, process flow proceeds to 1215.

In one embodiment, at 1215, the electronics control module generates various control signals as needed that are sent to fluid control system.

In one embodiment, at 1215, in response to the comparison of the real time sensor data and the control parameter input data, the electronics control module generates various control signals that are sent to fluid control system via a control signal data line.

As a specific illustrative example, and as discussed above with respect to FIGS. 2, 4, 5, and 6, in one embodiment, in response to the comparison of the real time sensor data 615 and the control parameter input data 605, the electronics control module 103 generates various control signals that are sent to fluid control system 110 via control signal data line 141. In response to the control signals from control signal data line 141, pressure up solenoid controlled valves PU1 of pressure up sub-system 111 or bleed down solenoid controlled valves BD1 of pressure down sub-system 112 of fluid control system 110 are selectively activated to regulate the pressure in the pipeline section being tested 120 and, if necessary, instigate an emergency shutdown of the test and to release all pressure from the pipeline section being tested. In one embodiment, all test data is recorded, stored, and made available as needed/desired by electronics control module 103.

As discussed above with respect to FIG. 5, in one embodiment, pressure up sub-system 111 is a series of pressure up solenoid-controlled valves (PU1), each of which can be individually controlled, or controlled in sets, by control signals from PLC 204P and/or PLC 204S via control signal data line 141.

In one embodiment, each of the pressure up solenoid-controlled valves (PU1) is connected to a pressure line that includes a gate or orifice 503 of a specific, or variable, diameter. In various embodiments, the diameters of gates or orifices 503 can be of different values, or different settings, so that the pressure provided can be controlled to very specific amount via the use of not only a subset of pressure up solenoid-controlled valves (PU1), but a subset of pressure up solenoid-controlled valves (PU1) having different associated gate or orifice 503 diameters. In this way very fine increments of pressure can be added by selecting various subsets of pressure up solenoid-controlled valves (PU1).

As also seen in FIGS. 2 and 5, in one embodiment, fluid control system 110 includes and a pressure down sub-system 112 for automatically bleeding off pressure from section of pipe to be tested 120 in response to control signals from PLC 204P and/or PLC 204S on control signal data line 141 using vent line 114 and vent 115.

In this specific illustrative example, pressure down sub-system 112 is a series of bleed down solenoid-controlled valves (BD1), each of which can be individually controlled, or controlled in sets, by control signals from PLC 204P and/or PLC 204S via control signal data line 141.

In one embodiment, each of the bleed down solenoid-controlled valves (BD1) is connected to a pressure line that includes a gate or orifice 511 of a specific, or variable, diameter. In various embodiments, the diameters of gates or orifices 511 can be of different values, or different settings, so that the pressure released can be controlled to very specific amount via the use of not only a subset of bleed down solenoid-controlled valves (BD1), but a subset of bleed down solenoid-controlled valves (BD1) having different associated gate or orifice 511 diameters. In this way very fine increments of pressure can be added by selecting various subsets of bleed down solenoid-controlled valves (BD1).

In one embodiment, when PLC 204P and/or PLC 204S of electronics control module 103 determines that the sensor data has deviated from the limits defined by the control parameter input data, PLC 204P and/or PLC 204S of electronics control module 103 automatically sends the appropriate control signal to the fluid control system 110 via control signal data line 141 to ensure the situation is quickly and automatically rectified and the test remains safe and accurate.

In one embodiment, if PLC 204P and/or PLC 204S of electronics control module 103 determines that the sensor data has deviated from the limits defined in by the control parameter input data in such a way that a defined emergency condition exists, electronics control module 103 automatically generates an emergency shut down control signal on control signal data line 141 that causes pressure down sub-system 112 to automatically bleed off pressure from the pipe section being tested 120 via vent line 114 and vent 115, to immediately and shut down the test.

As noted above, in one embodiment, there is also a manual Emergency Shutdown Device (ESD) 125 that can be manually activated to generate the emergency shut down control signal on data line 126 to make the pressure down sub-system 112 bleed off pressure from the pipe section being tested 120 immediately via vent line 114 and vent 115.

In one embodiment, once, in response to the comparison of the real time sensor data and the control parameter input data, one or more PLCs of the electronics control module generate various control signals that are sent to fluid control system via a control signal data line at 1215, process flow proceeds to 1217.

In one embodiment, at 1217 one or more PLCs of the electronics control module time stamps and records all the sensor data in real-time and maintains a record of all sensor data, actions taken, and test parameters throughout the entire test and this data is made available as needed.

As noted above, in one embodiment, during the entirety of the pressure test one or more PLCs of the electronics control module continuously capture all test data from the temperature and pressure transmitters, actuates the solenoids on the fluid control system as needed to adjust the test pressure, records all events that occur during the test (solenoid valve actuations, for example), and sends all information for display on control parameters data input system 105, external local display 238, or remotely at remote display 152.

In one embodiment, once one or more PLCs of electronics control module time stamps and records all the sensor data in real-time and maintains a record of all sensor data, actions taken, and test parameters throughout the entire test and this data is made available as needed at 1217, process flow proceeds to 1219.

In one embodiment, at 1219, the test data is made available to one or more remote locations in relative real time.

As a specific illustrative example, and as discussed above with respect to FIG. 2, in one embodiment, the disclosed method and system for pipeline testing includes one or more integrated communications lines 236, 237, and 235 to connect workers with each other as well as to connect the various system 100 components via hub 107.

As noted above, in one embodiment, system for pipeline testing 200 includes remote communications system 150, server 151, and remote display 152. In one embodiment, remote communications system 150 receives data from trailer communications system 118 and relays the data to server 151. In one embodiment, trailer communications system 118 and remote communications system 150 are connected by satellite, cell towers, and/or any other wireless communications system. In one embodiment, the data is then made available to remote display 152 for viewing remotely, in relative real time.

Once the required test duration is complete and test results approved by the Client, the Test Technician selects "End Test" on the control parameters data input system.

In addition, in one embodiment, all test results are, after Testing Technician review, published and made available to the client on client facing web interface 152 and sent via email to a pre-established report distribution list.

In one embodiment, once the test data is made available to one or more remote locations in relative real time at 1219 and the test is completed, method for pressure testing pipelines 1200 is ended at 1230 to await the next test.

The disclosed method for pipeline testing 1200 addresses and mitigates or negates the issues associated with prior art pipeline testing methods and systems.

In particular, method for pipeline testing 1200 eliminates the need for workers at various manual monitoring stations and valve operation stations by incorporating an automated fluid control system and remote sensors for collecting sensor data. In this way, using method for pipeline testing 1200, monitoring is performed by electronic sensors and the pipe pressure is automatically and remotely controlled in response to the control signals from the electronics control module, all without the need for human action/intervention. Consequently, fewer workers are required and those workers do not need to be stationed at various manual monitoring and valve stations, or near the pipeline section being tested. This represents a significant safety advantage and largely eliminates the time delays encountered using prior art systems.

In addition, by incorporating an electronics control module, an automated fluid control system, and remote electronic sensors, method for pipeline testing 1200 largely eliminates the potential for human error, as well as the delays in test system parameter monitoring, long reaction times, and inaccurate recording of information associated with prior art systems.

In addition, by incorporating an electronics control module, an automated fluid control system, and remote electronic sensors, system for pipeline testing 200 minimizes the prior art reliance on often unreliable, inaccurate, and time-consuming mechanical safety devices and the need to replace many of these components after they have been activated.

In addition, as discussed above, and in more detail below, in contrast to the prior art, one embodiment of method for pipeline testing 1200 provides redundant safety override systems including both an automatic and manual safety override/shutdown mechanism.

In addition, as discussed above, and in more detail below, in contrast to the prior art, method for pipeline testing 1200 provides backup systems and/or redundancy of components.

In addition, as discussed above, and in more detail below, in contrast to the prior art, method for pipeline testing 1200 provides a real time remote monitoring capability for clients and an integrated communications system to minimize the communication delays associated with prior art systems.

In addition, as discussed above, and in more detail below, in contrast to the prior art, method for pipeline testing 1200 provides a data recording mechanism that is not subject to human error and/or human manipulation and provides a systematic and efficient mechanism for creating standardized test data and storing that data securely.

For these and many other reasons discussed herein, method for pipeline testing 1200 solves the long standing and on-going technical problem of safely, accurately, effectively, and efficiently testing pipelines that also protects the public, workers, equipment being tested, and materials being transported by minimizing delays, opportunities for human error, and the reliance on manual safety devices.

In contrast to the embodiments disclosed herein, prior art methods and systems for pipeline testing do not have the automated pressure testing control and data logging, the automatic safety functions, or the real-time data/event logging and reporting on a client-facing web interface as disclosed above.

As noted, prior art methods and systems for pipeline testing involve capturing critical test data manually, manually compiling the data at the completion of a test into a report, scanning the test data, and then sending the test data/reports to the client for review and approval.

Consequently, the disclosed embodiments provide a significant improvement of prior art methods and systems for pipeline testing including, but not limited to, providing a significant cost and safety advantage, better reliability, better efficiency, and better mobility relative to existing solutions.

In particular, the disclosed embodiments: increase test safety; automatically monitor and control critical test parameters; eliminate the need for mechanical safety devices; eliminate reliance on human intervention; incorporate an automatic ESD; incorporate redundant systems; improve test reliability; provide for high resolution data being collected electronically and distributed in relative real-time; significantly reduce potential for human error or/or data manipulation; improve test efficiency; provide real-time test monitoring and reporting to clients; enable quicker, more timely, test data evaluation and approval; are housed in a highly mobile testing trailer; are standalone packages that can be taken to any project location; and provide satellite router and communications systems.

In one embodiment, a system for pipeline testing includes an electronics control module, the electronics control module generating control signals for automatically initiating corrective actions when needed.

In one embodiment, a system for pipeline testing includes a control parameters data input system, the control parameters data input system being in communication with the electronics control module such that control parameter input data entered through the control parameters data input system is provided to the electronics control module.

In one embodiment, a system for pipeline testing includes a fluid control system, the fluid control system being in communication with the electronics control module such that control signals generated by the electronics control module are provided to the fluid control system.

In one embodiment, a system for pipeline testing includes a section of pipe to be tested, the section of pipe to be tested being coupled to the fluid control system such that pressurized test medium can be supplied to the section of pipe to be tested by the fluid control system.

In one embodiment, a system for pipeline testing includes a pressurized test medium source, the pressurized test medium source providing pressurized test medium to the fluid control system such that the fluid control system controls the increase or decrease of the pressurized test medium that is provided to the section of pipe to be tested in response to the control signals generated by the electronics control module, thereby increasing or decreasing an amount of pressure in the section of pipe to be tested.

In one embodiment, a system for pipeline testing includes two or more sensors, the two or more sensors collecting sensor data from a section of pipe to be tested, the two or more sensors being in communication with the electronics control module such that sensor data from the two or more sensors is provided to the electronics control module.

In one embodiment, the electronics control module monitors the sensor data from the two or more sensors and compares the sensor data to control parameter input data and in response to the comparison of the sensor data and the control parameter input data, the electronics control module generates the control signals used to control the fluid control system and cause the fluid control system to increase or decrease the pressurized test medium that is provided to the section of pipe to be tested and thereby regulates the pressure in the section of pipe being tested.

In one embodiment, the electronics control module includes one or more processing components for: receiving the sensor data and control parameter input data; comparing the sensor data with the control parameter input data; and generating control signals for automatically initiating corrective actions when needed.

In one embodiment, at least one of the one or more processing components is a Programmable Logic Controller (PLC).

In one embodiment, the control parameters data input system is a Human/Machine Interface with a data entry mechanism.

In one embodiment, the fluid control system includes one or more electronically activated valves that are activated and deactivated based on the control signals from the electronics control module.

In one embodiment, the one or more sensors include one or more sensors selected from the group of sensors including: an ambient temperature sensor for generating ambient temperature data indicating the ambient temperature at the location of the section of pipe to be tested; a pipe temperature sensor for generating pipe temperature data indicating the temperature of the section of pipe to be tested; a ground temperature sensor for generating ground temperature data indicating the temperature of the ground at the depth of the section of pipe to be tested; and a pressure sensor for generating pressure data indicating the pressure within the section of pipe to be tested.

In one embodiment, if the comparison of the sensor data and the control parameter input data indicates an emergency condition exists, the electronics control module automatically generates a control signal used to control the fluid control system and cause the fluid control system to immediately release the pressurized in the section of pipe to be tested.

In one embodiment, an Emergency Shutdown Device (ESD) is included that when activated manually causes the fluid control system to immediately release the pressurized test medium that is provided to the section of pipe to be tested and thereby release the pressure in the section of pipe being tested.

In one embodiment, the electronics control module, the control parameters data input system, and the fluid control system are housed in a mobile pipeline testing trailer.

In one embodiment, a system for pipeline testing includes a mobile pipeline testing trailer.

In one embodiment, a system for pipeline testing includes an electronics control module housed in the mobile pipeline testing trailer, the electronics control module generating control signals for automatically conducting a pipeline test and automatically initiating corrective actions when needed.

In one embodiment, a system for pipeline testing includes a control parameters data input system housed in the mobile pipeline testing trailer, the control parameters data input system being in communication with the electronics control module such that control parameter input data entered through the control parameters data input system is provided to the electronics control module, the control parameter input data including test control parameter input data used by the electronics control module for conducting a pipeline test in the desired manner and parameters data indicating acceptable testing operations and parameter ranges.

In one embodiment, a system for pipeline testing includes a fluid control system housed in the mobile pipeline testing trailer, the fluid control system being in communication with the electronics control module such that control signals generated by the electronics control module are provided to the fluid control system, the fluid control system including a pressure up sub-system and a pressure down sub-system.

In one embodiment, a system for pipeline testing includes a section of pipe to be tested, the section of pipe to be tested being coupled to the fluid control system such that a pressurized test medium is supplied to the section of pipe to be tested by the fluid control system.

In one embodiment, a system for pipeline testing includes a pressurized test medium source, the pressurized test medium source providing pressurized test medium to the fluid control system such that the fluid control system uses the pressure up sub-system and pressure down sub-system to increase or decrease the amount of pressurized test medium that is provided to the section of pipe to be tested in response to the control signals generated by the electronics control module, thereby increasing or decreasing an amount of pressure in the section of pipe to be tested.

In one embodiment, a system for pipeline testing includes two or more sensors, the two or more sensors collecting sensor data from a section of pipe to be tested, the two or more sensors being in communication with the electronics control module such that the sensor data from the two or more sensors is provided to the electronics control module.

In one embodiment, as the electronics control module is conducting a pipeline test, the electronics control module monitors the sensor data from the two or more sensors and compares the sensor data to control parameter input data and in response to the comparison of the sensor data and the control parameter input data, the electronics control module generates the control signals used to control the pressure up sub-system and pressure down sub-system of fluid control system to cause the fluid control system to increase or decrease of amount of pressurized test medium that is provided to the section of pipe to be tested and thereby regulate the pressure in the section of pipe being tested.

In one embodiment, a system for pipeline testing includes an electronics control module, the electronics control module generating control signals for automatically conducting a pipeline test and automatically initiating corrective actions when needed.

In one embodiment, a system for pipeline testing includes a control parameters data input system, the control parameters data input system being in communication with the electronics control module such that control parameter input data entered through the control parameters data input system is provided to the electronics control module, the control parameter input data including test control parameter input data used by the electronics control module for conducting a pipeline test in the desired manner and parameters data indicating acceptable testing operations and parameter ranges.

In one embodiment, a system for pipeline testing includes a fluid control system, the fluid control system being in communication with the electronics control module such that control signals generated by the electronics control module are provided to the fluid control system, the fluid control system including a pressure up sub-system, the pressure up sub-system including two or more solenoid-controlled pressure up valves, the fluid control system including a pressure down sub-system, the pressure down sub-system including two or more solenoid controlled bleed down valves.

In one embodiment, a system for pipeline testing includes a section of pipe to be tested, the section of pipe to be tested being coupled to the fluid control system such that a pressurized test medium is supplied to the section of pipe to be tested through the fluid control system.

In one embodiment, a system for pipeline testing includes a pressurized test medium source, the pressurized test medium source providing pressurized test medium to the fluid control system such that he pressure up sub-system and pressure down sub-system of the fluid control system control an increase or decrease of the pressurized test medium that is provided to the section of pipe to be tested in response to the control signals generated by the electronics control module, thereby increasing or decreasing an amount of pressure in the section of pipe to be tested.

In one embodiment, a system for pipeline testing includes two or more sensors, the two or more sensors collecting sensor data from the section of pipe to be tested, the two or more sensors being in communication with the electronics control module such that the sensor data from the two or more sensors is provided to the electronics control module.

In one embodiment, the electronics control module monitors the sensor data from the two or more sensors and compares the sensor data to the control parameter input data and in response to the comparison of the sensor data and the control parameter input data, the electronics control module generates control signals to activate or deactivate the solenoid-controlled pressure up valves of the pressure up sub-system and activate or deactivate the solenoid-controlled bleed down valves of pressure down sub-system of fluid control system to cause the fluid control system to increase or decrease the amount of pressurized test medium that is provided to the section of pipe to be tested and thereby regulate the pressure in the section of pipe being tested.

In one embodiment, the electronics control module includes one or more Programmable Logic Controllers (PLCs) for: receiving the sensor data and control parameter input data; comparing the sensor data with the control parameter input data; and generating control signals for automatically conducting a pipeline test and automatically initiating corrective actions when needed.

In one embodiment, if the comparison of the sensor data and the control parameter input data indicates an emergency condition exists, the electronics control module generates a control signal to cause the solenoid-controlled bleed down valves of pressure down sub-system of fluid control system to immediately release the pressurized test medium that is provided to the section of pipe to be tested and thereby release the pressure in the section of pipe being tested.

In one embodiment, an Emergency Shutdown Device (ESD) is provided that when manually activated causes the solenoid-controlled bleed down valves of pressure down sub-system of the fluid control system to immediately release the pressurized test medium that is provided to the section of pipe to be tested and thereby release the pressure in the section of pipe being tested.

In one embodiment, at least some of the solenoid-controlled pressure up valves of the pressure up sub-system and/or the solenoid-controlled bleed down valves of the pressure down sub-system of the fluid control system are attached to pressure lines that include different diameter control gates or orifices.

In one embodiment, a method for pipeline testing includes providing an electronics control module, the electronics control module generating control signals for automatically initiating corrective actions when needed.

In one embodiment, a system for pipeline testing includes providing a control parameters data input system, the control parameters data input system being in communication with the electronics control module such that control parameter input data entered through the control parameters data input system is provided to the electronics control module.

In one embodiment, a system for pipeline testing includes providing a fluid control system, the fluid control system being in communication with the electronics control module such that control signals generated by the electronics control module are provided to the fluid control system.

In one embodiment, a system for pipeline testing includes coupling a section of pipe to be tested to the fluid control system such that a pressurized test medium is supplied to the section of pipe to be tested by the fluid control system.

In one embodiment, a system for pipeline testing includes providing a pressurized test medium source.

In one embodiment, a system for pipeline testing includes coupling the pressurized test medium source to the fluid control system such that pressurized test medium is provided to the fluid control system by the pressurized test medium source.

In one embodiment, a system for pipeline testing includes using fluid control system to increase or decrease the amount of the pressurized test medium that is provided to the section of pipe to be tested in response to the control signals generated by the electronics control module, thereby increasing or decreasing an amount of pressure in the section of pipe to be tested.

In one embodiment, a system for pipeline testing includes providing two or more sensors.

In one embodiment, a system for pipeline testing includes positioning the two or more sensors such that the two or more sensors collect sensor data from the section of pipe to be tested, the two or more sensors in communication with the electronics control module such that the sensor data from the two or more sensors is provided to the electronics control module.

In one embodiment, a system for pipeline testing includes using the electronics control module to monitor the sensor data from the two or more sensors and compare the sensor data to control parameter input data a pressure test is conducted. And, in response to the comparison of the sensor data and the control parameter input data, using the electronics control module to generate the control signals to cause the fluid control system to increase or decrease the amount of the pressurized test medium that is provided to the section of pipe to be tested and thereby regulate the pressure in the section of pipe being tested.

In one embodiment, the electronics control module includes one or more processing components for: receiving the sensor data and control parameter input data; comparing the sensor data with the control parameter input data; and generating control signals for automatically initiating corrective actions when needed.

In one embodiment, at least one of the one or more processing components is a Programmable Logic Controllers (PLC).

In one embodiment, the control parameters data input system is a Human/Machine Interface with a data entry touchscreen.

In one embodiment, the fluid control system includes one or more electronically activated valves that are activated and deactivated based on the control signals from the electronics control module.

In one embodiment, the one or more sensors include one or more sensors selected from the group of sensors including: an ambient temperature sensor for generating ambient temperature data indicating the ambient temperature at the location of the section of pipe to be tested; a pipe temperature sensor for generating pipe temperature data indicating the temperature of the section of pipe to be tested; a ground temperature sensor for generating ground temperature data indicating the temperature of the ground at the depth of the section of pipe to be tested.

In one embodiment, a system for pipeline testing includes a pressure sensor for generating pressure data indicating the pressure within the section of pipe to be tested.

In one embodiment, if the comparison of the sensor data and the control parameter input data indicates an emergency condition exists, the electronics control module automatically generates a control signal to cause the fluid control system to immediately release the pressurized test medium that is provided to the section of pipe to be tested and thereby release the pressure in the section of pipe being tested.

In one embodiment, an Emergency Shutdown Device (ESD) is provided that when activated causes the fluid control system to immediately release the pressurized test medium that is provided to the section of pipe to be tested and thereby release the pressure in the section of pipe being tested.

In one embodiment, a mobile pipeline testing trailer houses the electronics control module, the control parameters data input system, and the fluid control system in the mobile pipeline testing trailer.

In one embodiment, a method for pipeline testing includes providing a mobile pipeline testing trailer;

In one embodiment, a system for pipeline testing includes housing an electronics control module in the mobile pipeline testing trailer, the electronics control module generating control signals for automatically conducting a pipeline test and automatically initiating corrective actions when needed.

In one embodiment, a system for pipeline testing includes housing a control parameters data input system in the mobile pipeline testing trailer, the control parameters data input system being in communication with the electronics control module such that control parameter input data entered through the control parameters data input system is provided to the electronics control module, the control parameter input data including test control parameter input data used by the electronics control module for conducting a pipeline test in the desired manner and parameters data indicating acceptable testing operations and parameter ranges.

In one embodiment, a system for pipeline testing includes housing a fluid control system in the mobile pipeline testing trailer, the fluid control system being in communication with the electronics control module such that control signals generated by the electronics control module are provided to the fluid control system, the fluid control system including a pressure up sub-system and a pressure down sub-system.

In one embodiment, a system for pipeline testing includes coupling a section of pipe to be tested to the fluid control system such that a pressurized test medium is supplied to the section of pipe to be tested by the fluid control system.

In one embodiment, a system for pipeline testing includes providing a pressurized test medium source, the pressurized test medium source providing pressurized test medium to the fluid control system, the fluid control system using the pressure up sub-system and pressure down sub-system to increase or decrease the amount of the pressurized test medium that is provided to the section of pipe to be tested in response to the control signals generated by the electronics control module, thereby increasing or decreasing an amount of pressure in the section of pipe to be tested.

In one embodiment, a system for pipeline testing includes providing two or more sensors.

In one embodiment, a system for pipeline testing includes positioning the two or more sensors to collect sensor data from the section of pipe to be tested, the two or more sensors being in communication with the electronics control module such that the sensor data from the two or more sensors is provided to the electronics control module.

In one embodiment, a system for pipeline testing includes using the electronics control module to monitor the sensor data from the two or more sensors and compare the sensor data to control parameter input data; and in response to the comparison of the sensor data and the control parameter input data, using the electronics control module to generate the control signals used to control the pressure up sub-system and pressure down sub-system of fluid control system to cause the fluid control system to increase or decrease of the pressurized test medium that is provided to the section of pipe to be tested and thereby regulate the pressure in the section of pipe being tested.

In one embodiment, the fluid control system includes one or more electronically activated valves that are activated and deactivated based on the control signals from the electronics control module.

In one embodiment, a method for pipeline testing includes providing an electronics control module, the electronics control module generating control signals for automatically conducting a pipeline test and automatically initiating corrective actions when needed.

In one embodiment, a system for pipeline testing includes providing a control parameters data input system, the control parameters data input system being in communication with the electronics control module such that control parameter input data entered through the control parameters data input system is provided to the electronics control module, the control parameter input data including test control parameter input data used by the electronics control module for conducting a pipeline test in the desired manner and parameters data indicating acceptable testing operations and parameter ranges.

In one embodiment, a system for pipeline testing includes providing a fluid control system, the fluid control system being in communication with the electronics control module such that control signals generated by the electronics control module are provided to the fluid control system, the fluid control system including a pressure up sub-system, the pressure up sub-system including two or more solenoid-controlled pressure up valves, the fluid control system including a pressure down sub-system, the pressure down sub-system including two or more solenoid controlled bleed down valves.

In one embodiment, a system for pipeline testing includes coupling a section of pipe to be tested to the fluid control system such that a pressurized test medium is supplied to the section of pipe to be tested by the fluid control system.

In one embodiment, a system for pipeline testing includes providing a pressurized test medium source.

In one embodiment, a system for pipeline testing includes coupling the pressurized test medium source to the fluid control system such that the pressurized test medium is provided to the fluid control system.

In one embodiment, a system for pipeline testing includes using the pressure up sub-system and pressure down sub-system of fluid control system to increase or decrease the amount of the pressurized test medium that is provided to the section of pipe to be tested in response to the control signals generated by the electronics control module, thereby increasing or decreasing an amount of pressure in the section of pipe to be tested.

In one embodiment, a system for pipeline testing includes providing two or more sensors.

In one embodiment, a system for pipeline testing includes placing the two or more sensors to collect sensor data from the section of pipe to be tested, the two or more sensors being in communication with the electronics control module such that the sensor data from the two or more sensors is provided to the electronics control module;

In one embodiment, a system for pipeline testing includes using the electronics control module to monitor the sensor data from the two or more sensors and compare the sensor data to control parameter input data as a pipeline test is being conducted by the electronics control module; and in response to the comparison of the sensor data and the control parameter input data, using the electronics control module to generate control signals to activate or deactivate the solenoid-controlled pressure up valves of the pressure up sub-system and activate or deactivate the solenoid-controlled bleed down valves of pressure down sub-system of fluid control system to cause the fluid control system to increase or decrease of the pressurized fluid that is provided to the section of pipe to be tested and thereby regulate the pressure in the section of pipe being tested.

In one embodiment, the electronics control module includes one or more Programmable Logic Controllers (PLCs) for: receiving the sensor data and control parameter input data; comparing the sensor data with the control parameter input data; and generating control signals for automatically conducting a pipeline test and automatically initiating corrective actions when needed.

In one embodiment, the control parameters data input system is a Human/Machine Interface with a data entry touchscreen.

In one embodiment, the one or more sensors include one or more sensors selected from the group of sensors including: an ambient temperature sensor for generating ambient temperature data indicating the ambient temperature at the location of the section of pipe to be tested; a pipe temperature sensor for generating pipe temperature data indicating the temperature of the section of pipe to be tested; a ground temperature sensor for generating ground temperature data indicating the temperature of the ground at the depth of the section of pipe to be tested; and a pressure sensor for generating pressure data indicating the pressure within the section of pipe to be tested.

In one embodiment, if the comparison of the sensor data and the control parameter input data indicates an emergency condition exists, using the electronics control module to generate a control signal to cause the solenoid-controlled bleed down valves of pressure down sub-system of fluid control system to immediately release the pressurized test medium that is provided to the section of pipe to be tested and thereby release the pressure in the section of pipe being tested.

In one embodiment, an Emergency Shutdown Device (ESD) is provided that if activated causes the solenoid-controlled bleed down valves of pressure down sub-system of fluid control system to immediately release the pressurized test medium that is provided to the section of pipe to be tested and thereby release the pressure in the section of pipe being tested.

In one embodiment, at least some of the solenoid-controlled pressure up valves of the pressure up sub-system or the solenoid-controlled bleed down valves of the pressure down sub-system of the fluid control system are attached to pressure lines that include different diameter control gates or orifices.

In one embodiment, the electronics control module, the control parameters data input system, and the fluid control system are housed in the mobile pipeline testing trailer.

It should be noted that the language used in the specification has been primarily selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be regrouped as portions of one or more other of the process steps and/or operations discussed herein. Consequently, the particular order and/or grouping of the process steps and/or operations discussed herein do not limit the scope of the invention as claimed below.

In addition, the operations shown in the figures are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for pipeline testing comprising:

providing an electronics control module, the electronics control module generating control signals for automatically initiating corrective actions when needed;

providing a control parameters data input system, the control parameters data input system being in communication with the electronics control module such that control parameter input data entered through the control parameters data input system is provided to the electronics control module;

providing a fluid control system, the fluid control system being in communication with the electronics control module such that control signals generated by the electronics control module are provided to the fluid control system;

coupling a section of pipe to be tested to the fluid control system such that a pressurized test medium is supplied to the section of pipe to be tested by the fluid control system;

providing a pressurized test medium source;

coupling the pressurized test medium source to the fluid control system such that pressurized test medium is provided to the fluid control system by the pressurized test medium source;

using fluid control system to increase or decrease the amount of the pressurized test medium that is provided to the section of pipe to be tested in response to the control signals generated by the electronics control module, thereby increasing or decreasing an amount of pressure in the section of pipe to be tested;

providing two or more sensors;

positioning the two or more sensors such that the two or more sensors collect sensor data from the section of pipe to be tested, the two or more sensors in communication with the electronics control module such that the sensor data from the two or more sensors is provided to the electronics control module;

using the electronics control module to monitor the sensor data from the two or more sensors and compare the sensor data to control parameter input data a pressure test is conducted; and in response to the comparison of the sensor data and the control parameter input data, using the electronics control module to generate the control signals to cause the fluid control system to increase or decrease the amount of the pressurized test medium that is provided to the section of pipe to be tested and thereby regulate the pressure in the section of pipe being tested.

2. The method for pipeline testing of claim 1 wherein the electronics control module includes one or more processing components for:

receiving the sensor data and control parameter input data;

comparing the sensor data with the control parameter input data; and generating control signals for automatically initiating corrective actions when needed.

3. The method for pipeline testing of claim 2 wherein at least one of the one or more processing components is a Programmable Logic Controllers (PLC).

4. The method for pipeline testing of claim 1 wherein the control parameters data input system is a Human/Machine Interface with a data entry touchscreen.

5. The method for pipeline testing of claim 1 wherein the fluid control system includes one or more electronically activated valves that are activated and deactivated based on the control signals from the electronics control module.

6. The method for pipeline testing of claim 1 wherein the one or more sensors include one or more sensors selected from a group of sensors including:

an ambient temperature sensor for generating ambient temperature data indicating the ambient temperature at the location of the section of pipe to be tested;

a pipe temperature sensor for generating pipe temperature data indicating the temperature of the section of pipe to be tested;

a ground temperature sensor for generating ground temperature data indicating the temperature of the ground at the depth of the section of pipe to be tested; and a pressure sensor for generating pressure data indicating the pressure within the section of pipe to be tested.

7. The method for pipeline testing of claim 1, further wherein, if the comparison of the sensor data and the control parameter input data indicates an emergency condition exists, the electronics control module automatically generates a control signal to cause the fluid control system to immediately release the pressurized test medium that is provided to the section of pipe to be tested and thereby release the pressure in the section of pipe being tested.

8. The method for pipeline testing of claim 7, further comprising:

providing an Emergency Shutdown Device (ESD) that when activated causes the fluid control system to immediately release the pressurized test medium that is provided to the section of pipe to be tested and thereby release the pressure in the section of pipe being tested.

9. The method for pipeline testing of claim 1 further comprising:

providing a mobile pipeline testing trailer; and housing the electronics control module, the control parameters data input system, and the fluid control system in the mobile pipeline testing trailer.

10. A method for pipeline testing comprising:

providing a mobile pipeline testing trailer;

housing an electronics control module in the mobile pipeline testing trailer, the electronics control module generating control signals for automatically conducting a pipeline test and automatically initiating corrective actions when needed;

housing a control parameters data input system in the mobile pipeline testing trailer, the control parameters data input system being in communication with the electronics control module such that control parameter input data entered through the control parameters data input system is provided to the electronics control module, the control parameter input data including test control parameter input data used by the electronics control module for conducting a pipeline test in the desired manner and parameters data indicating acceptable testing operations and parameter ranges;

housing a fluid control system in the mobile pipeline testing trailer, the fluid control system being in communication with the electronics control module such that control signals generated by the electronics control module are provided to the fluid control system, the fluid control system including a pressure up sub-system and a pressure down sub-system;

coupling a section of pipe to be tested to the fluid control system such that a pressurized test medium is supplied to the section of pipe to be tested by the fluid control system;

providing a pressurized test medium source, the pressurized test medium source providing pressurized test medium to the fluid control system, the fluid control system using the pressure up sub-system and pressure down sub-system to increase or decrease the amount of the pressurized test medium that is provided to the section of pipe to be tested in response to the control signals generated by the electronics control module, thereby increasing or decreasing an amount of pressure in the section of pipe to be tested;

providing two or more sensors;

positioning the two or more sensors to collect sensor data from the section of pipe to be tested, the two or more sensors being in communication with the electronics control module such that the sensor data from the two or more sensors is provided to the electronics control module;

using the electronics control module to monitor the sensor data from the two or more sensors and compare the sensor data to control parameter input data; and in response to the comparison of the sensor data and the control parameter input data, using the electronics control module to generate the control signals used to control the pressure up sub-system and pressure down sub-system of fluid control system to cause the fluid control system to increase or decrease of the pressurized test medium that is provided to the section of pipe to be tested and thereby regulate the pressure in the section of pipe being tested.

11. The method for pipeline testing of claim 10 wherein the fluid control system includes one or more electronically activated valves that are activated and deactivated based on the control signals from the electronics control module.

12. The method for pipeline testing of claim 10 wherein the one or more sensors include one or more sensors selected from a group of sensors including:

an ambient temperature sensor for generating ambient temperature data indicating the ambient temperature at the location of the section of pipe to be tested;

a pipe temperature sensor for generating pipe temperature data indicating the temperature of the section of pipe to be tested;

a ground temperature sensor for generating ground temperature data indicating the temperature of the ground at the depth of the section of pipe to be tested; and a pressure sensor for generating pressure data indicating the pressure within the section of pipe to be tested.

13. The method for pipeline testing of claim 10, further comprising:

if the comparison of the sensor data and the control parameter input data indicates an emergency condition exists, using the electronics control module to generate a control signal to cause the fluid control system to immediately release the pressurized test medium that is provided to the section of pipe to be tested and thereby release the pressure in the section of pipe being tested.

14. The method for pipeline testing of claim 13, further comprising:

providing an Emergency Shutdown Device (ESD) that if activated causes the fluid control system to immediately release the pressurized test medium that is provided to the section of pipe to be tested and thereby release the pressure in the section of pipe being tested.

15. A method for pipeline testing comprising:

providing an electronics control module, the electronics control module generating control signals for automatically conducting a pipeline test and automatically initiating corrective actions when needed;

providing a control parameters data input system, the control parameters data input system being in communication with the electronics control module such that control parameter input data entered through the control parameters data input system is provided to the electronics control module, the control parameter input data including test control parameter input data used by the electronics control module for conducting a pipeline test in the desired manner and parameters data indicating acceptable testing operations and parameter ranges;

providing a fluid control system, the fluid control system being in communication with the electronics control module such that control signals generated by the electronics control module are provided to the fluid control system, the fluid control system including a pressure up sub-system, the pressure up sub-system including two or more solenoid-controlled pressure up valves, the fluid control system including a pressure down sub-system, the pressure down sub-system including two or more solenoid controlled bleed down valves;

coupling a section of pipe to be tested to the fluid control system such that a pressurized test medium is supplied to the section of pipe to be tested by the fluid control system;

providing a pressurized test medium source;

coupling the pressurized test medium source to the fluid control system such that the pressurized test medium is provided to the fluid control system;

using the pressure up sub-system and pressure down sub-system of fluid control system to increase or decrease the amount of the pressurized test medium that is provided to the section of pipe to be tested in response to the control signals generated by the electronics control module, thereby increasing or decreasing an amount of pressure in the section of pipe to be tested;

providing two or more sensors;

placing the two or more sensors to collect sensor data from the section of pipe to be tested, the two or more sensors being in communication with the electronics control module such that the sensor data from the two or more sensors is provided to the electronics control module;

using the electronics control module to monitor the sensor data from the two or more sensors and compare the sensor data to control parameter input data as a pipeline test is being conducted by the electronics control module; and in response to the comparison of the sensor data and the control parameter input data, using the electronics control module to generate control signals to activate or deactivate the solenoid-controlled pressure up valves of the pressure up sub-system and activate or deactivate the solenoid-controlled bleed down valves of pressure down sub-system of fluid control system to cause the fluid control system to increase or decrease of the pressurized test medium that is provided to the section of pipe to be tested and thereby regulate the pressure in the section of pipe being tested.

16. The method for pipeline testing of claim 15 wherein the electronics control module includes one or more Programmable Logic Controllers (PLCs) for:

receiving the sensor data and control parameter input data;

comparing the sensor data with the control parameter input data; and generating control signals for automatically conducting a pipeline test and automatically initiating corrective actions when needed.

17. The method for pipeline testing of claim 15 wherein the control parameters data input system is a Human/Machine Interface with a data entry touchscreen.

18. The method for pipeline testing of claim 15 wherein the one or more sensors include one or more sensors selected from a group of sensors including:

an ambient temperature sensor for generating ambient temperature data indicating the ambient temperature at the location of the section of pipe to be tested;

a pipe temperature sensor for generating pipe temperature data indicating the temperature of the section of pipe to be tested;

a ground temperature sensor for generating ground temperature data indicating the temperature of the ground at the depth of the section of pipe to be tested; and a pressure sensor for generating pressure data indicating the pressure within the section of pipe to be tested.

19. The method for pipeline testing of claim 15, further comprising:

if the comparison of the sensor data and the control parameter input data indicates an emergency condition exists, using the electronics control module to generate a control signal to cause the solenoid-controlled bleed down valves of pressure down sub-system of fluid control system to immediately release the pressurized test medium that is provided to the section of pipe to be tested and thereby release the pressure in the section of pipe being tested.

20. The method for pipeline testing of claim 19, further comprising:

providing an Emergency Shutdown Device (ESD) that if activated causes the solenoid-controlled bleed down valves of pressure down sub-system of fluid control system to immediately release the pressurized test medium that is provided to the section of pipe to be tested and thereby release the pressure in the section of pipe being tested.

21. The method for pipeline testing of claim 15 wherein at least some of the solenoid-controlled pressure up valves of the pressure up sub-system or the solenoid-controlled bleed down valves of the pressure down sub-system of the fluid control system are attached to pressure lines that include different diameter control gates or orifices.

22. The method for pipeline testing of claim 15 further comprising:

providing a mobile pipeline testing trailer; and housing the electronics control module, the control parameters data input system, and the fluid control system in the mobile pipeline testing trailer.

* * * * *